(12) United States Patent
O'Crowley

(10) Patent No.: US 7,840,673 B1
(45) Date of Patent: Nov. 23, 2010

(54) METHOD AND APPARATUS FOR MANAGEMENT OF HOSTED APPLICATIONS

(75) Inventor: Oisin Joseph O'Crowley, San Rafael, CA (US)

(73) Assignee: International Business Machines Corporation, Armonk, NY (US)

( * ) Notice: Subject to any disclaimer, the term of this patent is extended or adjusted under 35 U.S.C. 154(b) by 2546 days.

(21) Appl. No.: 10/174,306

(22) Filed: Jun. 17, 2002

(51) Int. Cl.
*G06F 15/173* (2006.01)
(52) U.S. Cl. .................. 709/226; 709/224; 709/201; 709/220
(58) Field of Classification Search ............ 709/226, 709/244, 201, 220
See application file for complete search history.

(56) References Cited

U.S. PATENT DOCUMENTS

| | | | |
|---|---|---|---|
| 5,632,011 | A | 5/1997 | Landfield et al. |
| 5,664,185 | A | 9/1997 | Landfield et al. |
| 5,727,156 | A | 3/1998 | Hoyman et al. |
| 5,734,820 | A | 3/1998 | Howard et al. |
| 5,758,126 | A | 5/1998 | Daniels et al. |
| 5,771,343 | A | 6/1998 | Hafner et al. |
| 5,794,206 | A | 8/1998 | Wilkinson et al. |
| 5,870,542 | A | 2/1999 | Ander et al. |

(Continued)

FOREIGN PATENT DOCUMENTS

WO      WO00/36503      6/2000

(Continued)

OTHER PUBLICATIONS

Data Sheet, Interwoven OpenDeploy 5.0, Interwoven moving business to the web™; Publication date unknown but no later than Mar. 5, 2002.

(Continued)

*Primary Examiner*—Thu Nguyen
*Assistant Examiner*—Lan-Dai T Truong
(74) *Attorney, Agent, or Firm*—Ojanen Law Offices; Karuna Ojanen; Charles C. Cary

(57) ABSTRACT

A method and apparatus is disclosed for managing administrative data transfers to/from hosted applications. Administrative data transfers (ADT) include: application maintenance and electronic data transfers (EDT). In an embodiment of the invention an application manager is provided for managing a plurality of host servers each hosting a corresponding application accessible to clients across a network for the exchange of client data. The application manager manages ADT for at least one of application maintenance of the corresponding application and electronic data transfers (EDT) between selected ones of the clients on the network and selected ones of the plurality of host servers. In an embodiment of the invention a control file manager is disclosed which is accessible to an administrative member of each group of clients for managing setup, scheduling and execution of control files for each client group. Each control file defines an ADT with a data source, a data target, and a schedule for effecting the ADT. The control file manager includes a migration module responsive to a migration request by the administrative member of a corresponding client group to migrate a control file from a one to an other hosted environment. The environmental mapper maps the corresponding one of the data source and the data target of the corresponding control file from the one to the other of the hosted environments. In alternate embodiments of the invention methods and software for managing a plurality of host servers is disclosed.

16 Claims, 20 Drawing Sheets

U.S. PATENT DOCUMENTS

| | | | |
|---|---|---|---|
| 5,870,552 A | | 2/1999 | Dozier et al. |
| 5,872,928 A | * | 2/1999 | Lewis et al. ................. 709/222 |
| 5,893,076 A | | 4/1999 | Hafner et al. |
| 5,928,333 A | | 7/1999 | Landfield et al. |
| 5,944,789 A | * | 8/1999 | Tzelnic et al. .............. 709/214 |
| 6,148,330 A | | 11/2000 | Puri et al. |
| 6,192,034 B1 | | 2/2001 | Hsieh et al. |
| 6,230,201 B1 | * | 5/2001 | Guck et al. ................. 709/228 |
| 6,259,700 B1 | | 7/2001 | Hsieh et al. |
| 6,263,332 B1 | | 7/2001 | Nasr et al. |
| 6,625,750 B1 | * | 9/2003 | Duso et al. ................... 714/11 |
| 6,785,728 B1 | * | 8/2004 | Schneider et al. ........... 709/229 |
| 6,847,957 B1 | * | 1/2005 | Morley ........................ 706/47 |
| 2002/0002704 A1 | * | 1/2002 | Davis et al. ................... 717/11 |
| 2002/0159437 A1 | * | 10/2002 | Foster et al. ................. 370/351 |
| 2003/0088536 A1 | * | 5/2003 | Behnia ......................... 707/1 |

FOREIGN PATENT DOCUMENTS

| | | | |
|---|---|---|---|
| WO | WO 01/025910 | * | 4/2001 |
| WO | WO01/25986 A2 | | 4/2001 |
| WO | WO01/37158 A1 | | 5/2001 |

OTHER PUBLICATIONS

Data Sheet, Interwoven DataDeploy 5.0, Interwoven moving business to the web™; Publication date unknown but no later than Mar. 5, 2002.

Connect: Direct, Sterling Commerce; Publication date unknown but no later than Mar. 5, 2002.

* cited by examiner

ASSET TABLE (500)

| | Cust (502) | Env (504) | Server Path (506) | Hardware Platform-OS;Bk (508) | Software Platform (510) | Apps (512) | Status (514) | Map (516) |
|---|---|---|---|---|---|---|---|---|
| 518 | Cust1 | Dev | /234/P1 | Dell;W2k;No | WebSvr=Apache AppSvr=WebSph DbSvr=MSSQL | 1,2,7 | Available | |
| 520 | Cust1 | Test | /234/P2 | Dell;W2k;No | WebSvr=Apache AppSvr=WebSph DbSvr=MSSQL | 1,2,7 | Available | |
| 522 | Cust1 | Prod | /235/ | Dell;W2k;No | WebSvr=Apache | | Available | |
| 524 | Cust1 | Prod | /236/ | Dell;W2k;Yes | AppSvr=WebSph | 1,2,7 | Available | |
| 526 | Cust1 | Prod | /237/ | Dell;W2k;Yes | DbSvr=MSSQL | | Available | |
| 528 | Cust2 | Dev | /134/P1 | IBM;Unix;No | WebSvr=Apache AppSvr=WebSph DbSvr=MSSQL | 3,6 | Available | |

FIG. 5A

DATA POLICY TABLE (550)

| | Cust (552) | Env | UpGrade (554) | Patch (556) | Recov (558) | Hub>Cus (560) | Cus>Hub (562) | Hub>3Pt (564) | Hub>3Pt (566) | 3Pt>Hub (568) |
|---|---|---|---|---|---|---|---|---|---|---|
| 570 | Cust1 | Dev | W/t|A/t|D/t | W/t|A/t|D/t | W/t|A/t|D/t | P/t|T/t|D/t | P/t|T/t|D/t | P/t|T/t|D/t | P/t|T/t|D/t | P/t;T/t;D/t |
| 572 | Cust1 | Test | W/t|A/t|D/t | W/t|A/t|D/t | W/t|A/t|D/t | P/t|T/t|D/t | P/t|T/t|D/t | P/t|T/t|D/t | P/t|T/t|D/t | P/t;T/t;D/t |
| 574 | Cust1 | Prod | W/h|A/h|D/h | W/n|A/n|D/n | W/n|A/n|D/n | P/t|T/t|D/t | P/t|T/t|D/t | P/h|T/n|D/n | P/h|T/h;D/n | P/h;T/h;D/h |
| 576 | Cust2 | Dev | W/t|A/t|D/t | W/t|A/t|D/t | W/t|A/t|D/t | P/t|T/t|D/t | P/t|T/t|D/t | P/t|T/t|D/t | P/t|T/t|D/t | P/t;T/t;D/t |

FIG. 5B

MIGRATION TABLE 750

| Env | App. Maint. ADT | EDI ADT |
|---|---|---|
| Dev | N/A | N/A |
| Test | Hold & Notify | Notify |
| UAT | Hold & Notify | Notify |
| Train | Hold & Notify | Notify |
| Prod | Hold & Notify | Hold & Notify |

FIG. 7B

ERROR POLICY TABLE 770

| Direction | Source Error | Target Error |
|---|---|---|
| Inbound | Notify | TermAll-Notify |
| Outbound | TermAll-Notify | Notify |

FIG. 7C

CONTROL FILE ADD/EDIT/MIGRATION

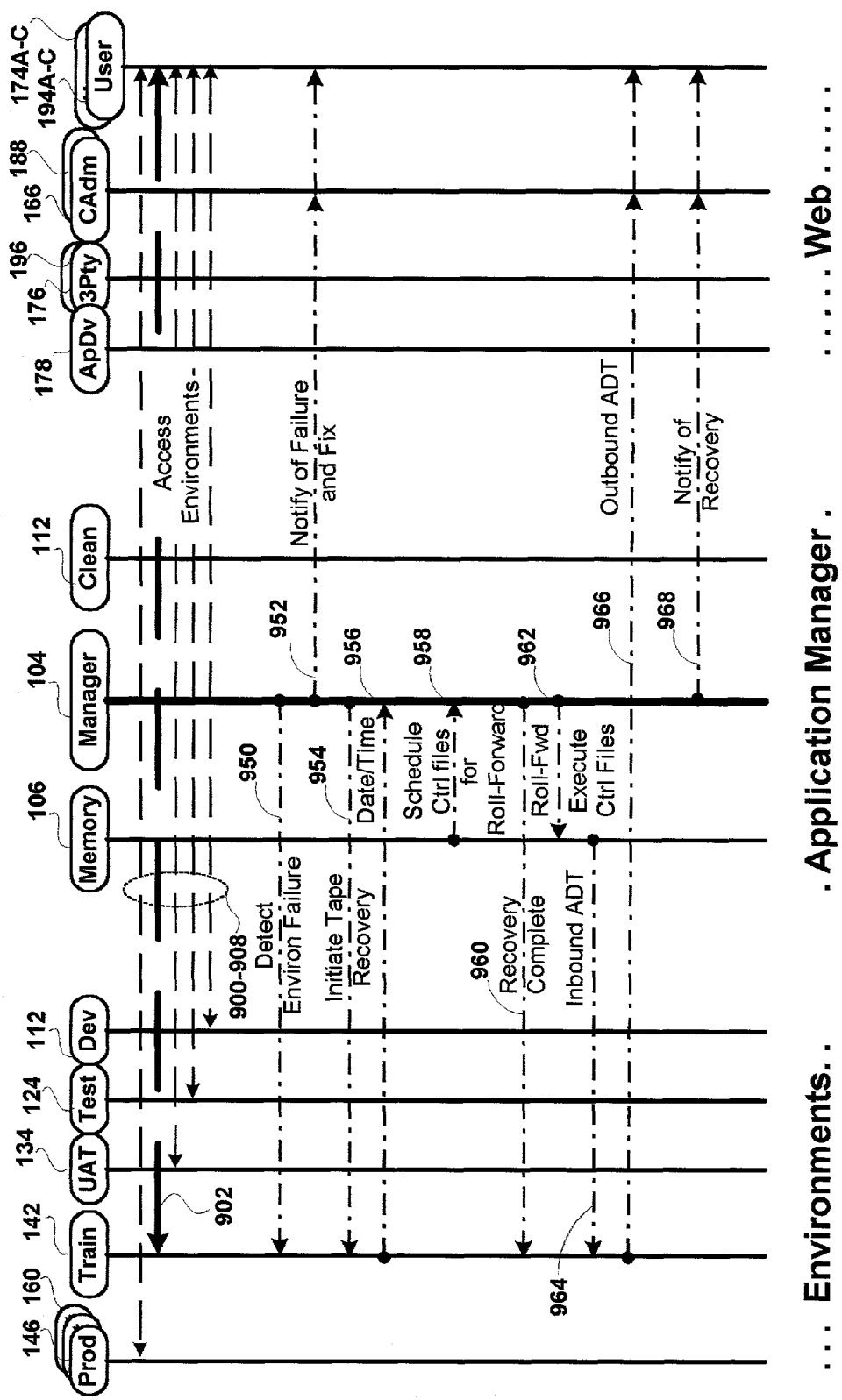
FIG. 9C  RECOVERY ROLL-FORWARD

METHOD AND APPARATUS FOR MANAGEMENT OF HOSTED APPLICATIONS

BACKGROUND OF THE INVENTION

1. Field of Invention

The field of the present invention relates in general to networks and more particularly to the hosting of applications on a network.

2. Description of the Related Art

The growth of the global network identified as the Internet has in part been spawned by a range of business applications made available on the Internet. These include online: catalogues; shopping; financial services; financial management; marketing; business exchanges; customer relationship management; and entertainment such as news and sports. Each of these online applications requires a complex set of hardware and software for delivery. The hardware elements include at a minimum firewalls; switches; routers; web, application and database servers and backup devices all of which need to be connected to the Internet. The skill sets required to manage these elements and the associated software are formidable.

The management task is made more formidable by the availability and security requirements for online applications. Typically an online application must target 24/7/365 availability. This availability target dictates the introduction of redundancy into the hardware and software which in turn adds to the complexity of the management task. The security requirements are dictated by the nature of the information, typically highly sensitive, being transmitted and stored by each of the applications. Since the Internet is an open medium the hardware environment used to provide the application is subject to constant threat of attack. Even when information is transmitted the packets in which it is bundled may be intercepted. Various measures and counter-measures exists to address each security issue, but they are in a constant state of flux.

Not surprisingly the task of managing and provisioning of Internet applications has fallen on the shoulders of a specialized class of vendors, currently identified as Application Service Providers (ASPs). These third-party vendors may be part of a large enterprise, may be a separate entity from the enterprise, may be part of the independent software vendor, or businesses which provide a specific application, or may exist separately from those businesses. They manage and distribute software-based services and solutions to customers across a wide area network such as the Internet from a central data center on which the applications are hosted. In essence, ASPs provide a way for companies to outsource some aspects of their information technology (IT) needs. A typical ASP manages the hosting of multiple applications for multiple businesses or business units, with each application having its own discrete client audiences. The ASP is thus in a position to justify the considerable investment in personnel, hardware, and software needed to host Internet applications.

Success or failure of ASPs rests on providing personalized solutions for each application vendor and corresponding client group and on automating its services. A typical ASP achieves this level of service with a corresponding growth in personnel, which cuts into profitability. What is needed are new service solutions for ASPs which enhance profitability and improve customer responsiveness.

SUMMARY OF THE INVENTION

A method and apparatus is disclosed for managing administrative data transfers to/from hosted applications. Administrative data transfers (ADT) include: application maintenance and electronic data transfers (EDT). Application maintenance ADT inject software upgrades, patches, add-ins from multiple $3^{rd}$ party vendors into the hosted applications. Software includes: operating system software; platform software, e.g. web agent, application server, and database server; and the application software itself EDT are the data transfers required by business partners and $3^{rd}$ parties which participate with the customers of each hosted application. Typical EDT include: catalogs, customer lists, tax tables, inventory updates, etc. The application manager of the current invention manages both EDT as well as application maintenance ADT.

In an embodiment of the invention an apparatus is provided for managing a plurality of host servers each hosting a corresponding application accessible to clients across a network for the exchange of client data. The apparatus comprises: an application manager. The application manager couples to the plurality of host servers and to the network, and the application manager manages ADT for at least one of application maintenance of the corresponding application and EDT between selected ones of the clients on the network and selected ones of the plurality of host servers.

In an embodiment of the invention an apparatus is provided for managing a plurality of host servers hosting at least one application in a plurality of environments accessible to corresponding clients across a network for the exchange of client data. The apparatus comprises a control file manager. The control file manager is accessible to an administrative member of each group of clients for managing setup, scheduling and execution of control files for each client group. Each control file defines an ADT with a data source, a data target, and a schedule for effecting the ADT. The control file manager includes a migration module and an environmental mapper. The migration module is responsive to a migration request by the administrative member of a corresponding client group to migrate a control file from a one of the plurality of environments to an other of the plurality of environments. The environmental mapper is responsive to the migration request to map the corresponding one of the data source and the data target of the corresponding control file from the one of the plurality of environments to the other of the plurality of environments.

In alternate embodiments of the invention, methods and software for managing a plurality of host servers is disclosed.

BRIEF DESCRIPTION OF THE DRAWINGS

These and other features and advantages of the present invention will become more apparent to those skilled in the art from the following detailed description in conjunction with the appended drawings in which:

FIGS. 5A-B show an embodiment of the asset and data policy tables respectively for storing contract information entered via the graphical interfaces shown in FIGS. 4A-B.

FIGS. 7B-C show an embodiment of the migration and error policy tables respectively for storing global contract policies entered via the graphical interface shown in FIG. 7A.

FIGS. 9A-C are candlestick diagrams of embodiments of data transfers associated with control file setup, execution, and recovery in the embodiment of the invention shown in FIG. 1.

DETAILED DESCRIPTION OF THE EMBODIMENTS

Figure 1:
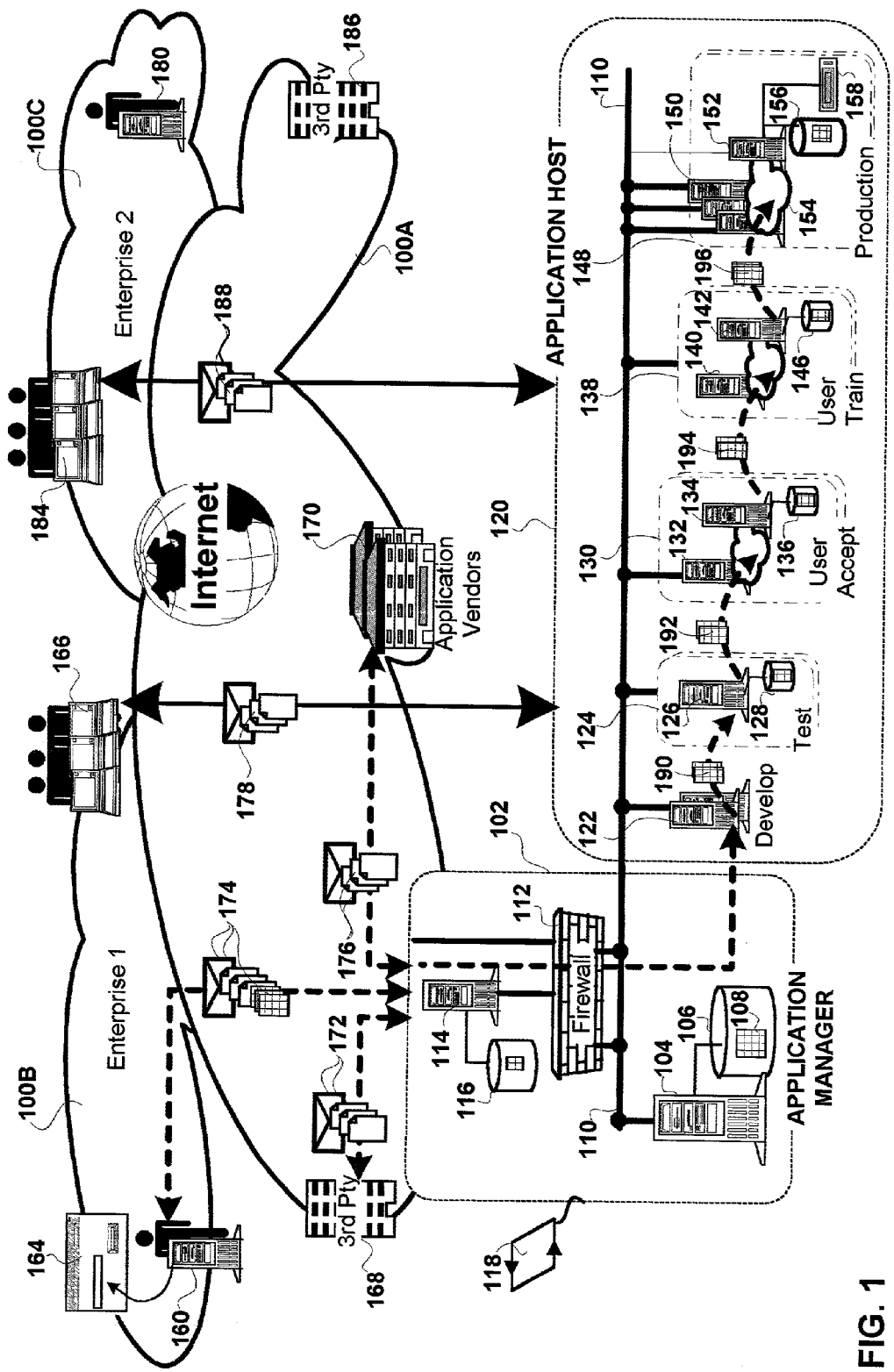
FIG. 1 shows an embodiment of the current invention with an application manager managing administrative data flow between a plurality of servers which provide multiple application environments to clients via a network.

FIG. 1 shows an embodiment of the current invention with an application manager 102 managing administrative data flows between a plurality of servers 120 which host one or more applications to clients 160, 166, 168, 170, 184, 186 via networks 100A-C. Clients may include: application vendors 170 who provide the software applications hosted on servers 120; $3^{rd}$ party business partners 168,186; enterprises which include administrators 160, 180 and employees 166,184. A representative client group is a business/enterprise and any third parties business or otherwise which partner with the business. Two client groups are shown. The term "client" will be used interchangeably to refer to a particular user and/or to a computer or other network access device available to the user. The first client group includes an administrator 160, employees 166 and $3^{rd}$ party business partner(s) 168. The second client group includes an administrator 180, employees 184 and $3^{rd}$ party business partner(s) 186. Employees 166 and 188 of both client groups are shown exchanging client data 178, 188 respectively with corresponding ones of the plurality of servers 120.

The plurality of servers are shown providing a set of environments to each client group. Each environment is at least logically, and perhaps physically, separate from other environments in the set. All environments within a set have in common at least one application. An environment that exists uniquely on a discrete machine is a physical environment. Environments that exist on different partitions of the same server or set of servers along with other environments of the same or other environmental sets are said to be logical environments.

A typical environmental set for a single client group includes: a development environment 122, a test environment 124, a user acceptance environment 130, a user training environment 138 and a production environment 148. The environments provide discrete instances of a hosted application (s), each targeted to a different audience within the client group and all dedicated to improving the integrity and reducing the downtime of the critical production environment on which all members of a client group depend.

The production environment 148 includes all application components as well as complete client data. Client data flows directly to/from the users within a client group and the corresponding server(s). In a business exchange client data may include: product identification, trade quantities, and pricing. In a CRM application client data may include: customer name, address, and order history. In a financial application client data may include: accounts payable or receivable. Each production environment handles for the corresponding client group the 24/7/365 business of the client group and its $3^{rd}$ party partners. The production environment is typically hosted on multiple physical machines each with one or more of the application components of a networked application which may include: a web agent, an application and a database. In the embodiment shown in FIG. 1 the production environment includes a bank of servers 150 on which the web agent and application are hosted. These are coupled via a local area network (LAN) 154 with a server 152 on which a database application is hosted. The client data handled by the database application is stored in memory 156 and backed up in a backup storage device 158. The backup storage device is used to recover data in the event of a server failure. In an embodiment of the invention the backup device backs up a plurality of servers across a plurality of client groups and environment sets.

The user training environment 138 includes all application components as well as such minimal client data as is required to support the training. Each user training environment handles for the corresponding client group the training of new members of a client group on an existing application or of old members of a client group on a new module of an application. All the training is done separately from the production environment so that any errors in the entry of client data by the trainees will not effect the accuracy of the client data in the production environment. The user training environment does not require the bandwidth of a production environment. Therefore fewer servers are utilized. In the embodiment shown in FIG. 1 the user training environment includes a server 140 on which the web agent and application are hosted. This is coupled with a server 142 on which a database application is hosted. The client data handled by the database application is stored in memory 146. No backup is provided since the integrity of the client training data is not critical to the client group.

The user acceptance environment 130 includes all application components and little or no client data. Each user acceptance environment allows employees within a client group to evaluate a new application, upgrade or customization. In the embodiment shown in FIG. 1 the user acceptance environment includes a server 132 on which the web agent and application are hosted. This is coupled with a server 134 on which a database application is hosted. Any client data handled by the database application is stored in memory 136.

The test environment 124 includes all application components as well as such minimal client data as is required to support the testing. Each test environment provides for the information technology (IT) department of the corresponding client group the ability to test a new application or upgrades to an existing application. The test environment requires very little bandwidth, therefore only one server 126 with accompanying storage 128 is provided.

The development environment includes a portion of the application components as well as such minimal client data as is required to support the testing. Each development environment provides for the IT department of the corresponding client group the ability to customize an existing application by adding for example a new report capability. The development environment requires very little bandwidth, therefore only one server 122 is shown.

Any type of application may be hosted across the different environments within a client group's environmental set. Representative applications provided by vendors 170 include: business exchanges such as SAPMarkets™, SAP AG Walldorf Germany, Commerce One.net™, Commerce One, Inc., Pleasanton, Calif.; or customer relationship management (CRM) applications such as Siebel System 7™, Siebel Systems, Inc. San Mateo, Calif.; or financial management applications such as PeopleSoft 8™, PeopleSoft Inc., Pleasanton, Calif. 94588-8618, or websites for marketing, entertainment, etc. The application(s) require other software components to operate. The components required to deliver an application are typically provided by others of the vendors 170. Software components include: operating systems such as Windows™ 2000, Microsoft Corp. Redmond, Wash. or Solaris™ 9 Sun Microsystems Inc. Palo Alto, Calif.; a web agent such as Apache, by the Apache Software Foundation, Forest Hill, Md. or IIS™ by Microsoft Corp. Redmond, Wash.; an application such as those discussed above, an application server such as WebSphere™ by IBM Corp. White Plains, N.Y. or WebLogic™ by BEA Systems of San Jose, Calif.; a database such as MS SQL™ by Microsoft Corp. Redmond, Wash. or Oracle 9i™ by Oracle, Redwood Shores, Calif. or DB2™ by IBM Corp. White Plains N.Y. and additional components such as anti-virus and tape-backup software for example.

Client data flow between the server(s) and members of the client group is by no means the only data flow required to support hosted applications. The hosted applications require maintenance in the form of upgrades, patches, add-ins and add-ons, etc. The client groups business partners may require bulk transfers of data in the form of customer lists, tax tables, inventory updates, etc. Application maintenance has traditionally been handled on a server by server basis. Traditionally, bulk data transfers have been elevated above the manual level as a result of a patchwork of customized programming collectively identified as electronic data transfer (EDT). The application manager of the current invention manages both EDT as well as application maintenance.

The application manager 102 processes 118 manage setup, execution and migration of control files effecting administrative data transfers in each of the environments available to each client group. In an embodiment of the invention the application manager also handles setup and enforcement of client contracts which define the assets associated with each of the client group's environments and the data transfer policies for control file execution within each environment.

Control files specify source, target and schedule for corresponding data transfers. A control file setup by the ASP administrator (not shown) and the administrator within each client group is accomplished via graphical user interfaces (GUIs) presented to the administrator by the application manager 102. Administrator 160 is shown viewing a GUI 164 for accessing the application manager. The control files are stored by the application manager. The application manager couples with both the wide area network (WAN) 100A-C and the multiple servers 120. The application manager couples with the servers via a virtual private network (VPN). The embodiment of the application manager shown in FIG. 1 includes a cleanup server 114 with associated storage 116 for performing a virus scan on incoming data transfers. The cleanup server couples through firewall 112 with application manager server 104. The application manager server couples with memory 106. The memory includes a repository for storage of copies of all incoming data transfers whether for application maintenance or EDT. The memory also stores control, contract, global and other files for controlling data transfers to and from the plurality of servers 120.

The application maintenance and EDT managed by the application manager are collectively referred to as administrative data transfers (ADT). Each ADT is initiated by scheduling and execution by the application manager of the control files which specify a corresponding ADT.

Application maintenance ADTs, include data transfers 176 from application vendors 170 or consultants, of application upgrades, patches, add-ins or add-ons. Each application maintenance ADT may also be accompanied by an associated script or executable file to integrate the transferred data into the selected application or application component within a corresponding environment. EDT occur between one of the client group's hosted environments and $3^{rd}$ party business associates of the client group. Examples of EDT include: client lists, tax tables, inventory, pricing, catalogues, data files, user profiles, program data, data loads, confirmations, surveys, etc. EDT may also be accompanied by an associated script or executable file to integrate the transferred data into the selected target location.

In addition to automating ADTs the application manager has two additional functions. First, the application manager manages control file migration 190, 192, 194, 196 between each of the supported environments. Typically, a control file will not be placed directly into a production environment until it has been thoroughly de-bugged. Debugging typically begins with the lowest level environment, e.g. Development. Once a control file performs correctly in the development environment it may be migrated, a.k.a. promoted to a next higher level environment, e.g. Test, where it is subject to further de-bugging. The migration of each control file is managed by the application manager and will be set forth in greater detail in FIGS. 6A,8A and the accompanying text. Second, the application manager manages server recovery including: failure detection, fail-over, backup restoration and roll-forward. Once a failure is detected the application manager determines whether recovery will be performed on the same or different hardware platform. Once a platform is selected, a restoration of backup data is performed. Then control files are selectively re-executed to roll-forward the restored environment to the state that existed at time of failure as opposed to time of last backup. Each of these administrative data transfers will be discussed in greater detail in the following text and accompanying figures.

In the embodiment of the invention shown in FIG. 1 the application manager 102 may be provided by an application service provider (ASP) and the plurality of servers 120 by an application host. Alternately, the application manager and plurality of servers may all be provided by an application service provider.

Figure 2:
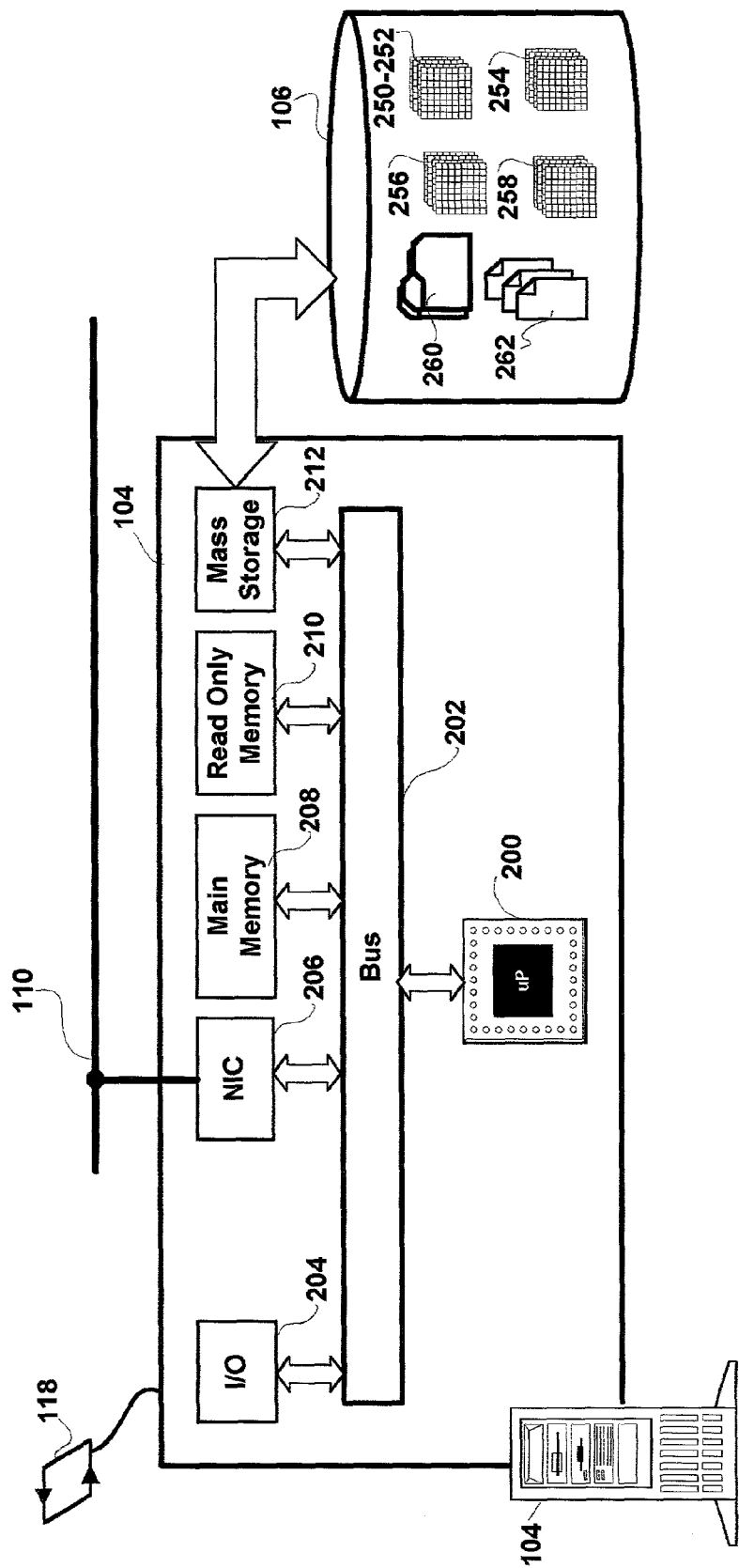
FIG. 2 is a hardware block diagram of a computer suitable for use in executing the processes associated with the application manager shown in FIG. 1.

FIG. 2 is a hardware block diagram of a computer suitable for use in executing the processes associated with the application manager shown in FIG. 1. The hardware blocks associated with the application manager server 104 are shown. The application manager server includes: an input output (I/O) module 204, a network interface card (NIC) 206, a main memory 208, a read only memory (ROM) 210, mass storage driver 212 and a processor 200 coupled to one another via a system bus 202. The I/O module handles the user interface devices such as the keyboard and display (not shown). The NIC handles the packetized communication of the application manager server over the network 110 with both the external network 100A-C via the firewall as well as with the plurality of servers 120 via a VPN or other secure link. The ROM is a non-volatile memory which stores the basic input/output system (BIOS) for the server. The main memory is a random access memory (RAM) which stores data and instructions on which the processor is operating. The instructions come from program code and applications stored in non-volatile memory 106. The server is coupled with the memory via the mass storage driver which handle the details of reading and writing data. The memory includes program code 260 for implementing the application manager processes 118 (See FIGS. 1-3) as well as GUIs 262 for interfacing the ASP and client administrators with the application manger. The memory may also include: client contract files 250, global contract administration files 252, control files 254, control file log 256 and repository 258, etc. The client contract files store the asset policy and data policies which the IT administrator of each client group has contracted for in each environment of the client group's set of environments. The global contract administration files store the control file migration and error handling tables as defined by the ASP administrator of the application manager. The control files govern the source, target and scheduling of data transfers as well as migration requests for the movement of a control file from one environment to another. The control file log is a master list of all control file scheduling both past, present, and future. The repository stores copies of an administrative data source for those control files which call for an inbound data transfer from the network to a targeted environment on one of the servers 120. These copies are used to roll-forward an environment after backup restoration of a server(s) supporting the environment from a hardware or software failure.

Figure 3:
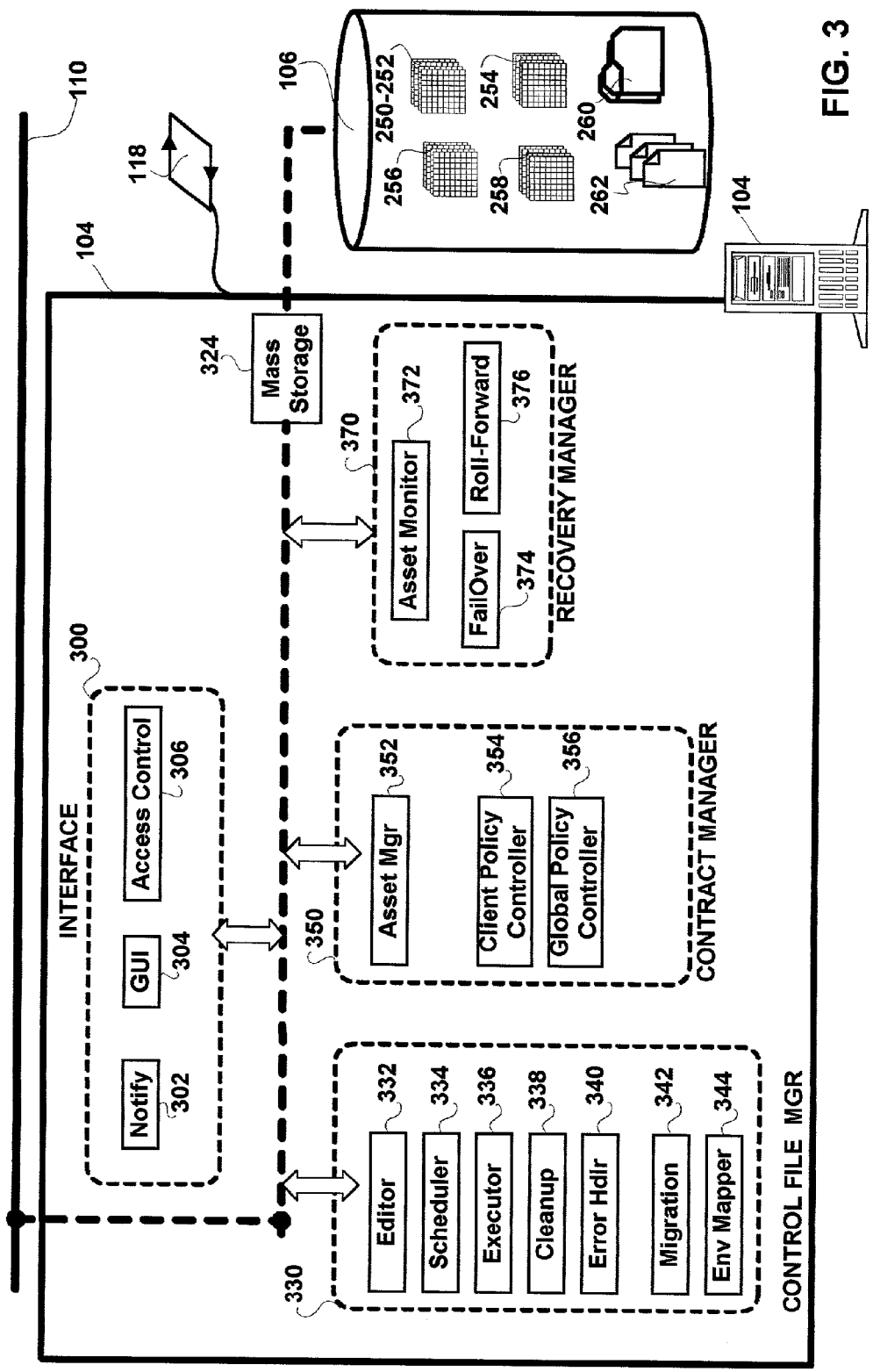
FIG. 3 shows an embodiment of the software modules executed by the application manager server shown in FIG. 1.

FIG. 3 shows an embodiment of the software modules on the application manager server 104 shown in FIG. 1. The modules include: interface module 300, mass storage drivers 324, control file manager module 330, contract manager module 350 and recovery manager module 370. Collectively these modules manage control file setup and scheduling as well as migration of control files from one to another environment. Additionally, in the event of a failure of any server the application manager modules handle fail-over and roll-forward.

The interface module 300 controls administrative interfacing with the application manager. The interface module includes the following sub-modules: notification 302, graphical user interface (GUI) 304 and access control 306. The access control sub-module controls access to the application manager server by the ASP administrator and by the administrators within each client group. The GUI sub-module operates as a web agent, controlling delivery to the administrators of the appropriate interfaces and the acceptance of parameters entered therein for the contract and control file managers. The notification sub-module controls the delivery via e-mail, pager, telephony, browser or other communication means of notices to the appropriate administrator(s) concerning the operation of their environments and the control files executing thereon. These notifications may include: an error condition in the execution of a control file; a hold condition on a requested migration of a control file from one environment to another; a failure of an environment and a recovery and a roll-forward of an environment for example.

The contract manager module 350 controls the setup and management of assets, environments, assess and policies for each of the client groups and for the ASP. The contract manager module includes the following sub-modules: asset manager 350, client policy controller 354 and global policy controller 356. The asset manager sub-module allows a client administrator to establish environments for the group and to specify the architecture thereof including the selection and setup of server(s), and software. Software includes: operating system, application platform, and application. The application platform includes: the web agent, application server and database. The client policy controller sub-module allows the administrator(s) within each client group to establish notification and execution policies for various types control files within each environment. The client policy controller also allows each groups administrator to delegate roles and responsibilities for control file setup to other members of the corresponding client group, within specific environments for example. The global policy controller sub-module allows the ASP administrator(s) to establish notification and execution policies for various types control files within each environment.

The control file manager module 330 controls the setup, scheduling, and execution of control files in accordance with the policies each client group has contracted for with the contract manager module. The control file manager module includes the following sub-modules: editor 332, schedule 334, executor 336, cleanup 338, error handler 340, migration 342 and environmental mapper 344. The editor sub-module allows: adding, updating and deleting of control files by client or ASP administrators. The schedule sub-module handles scheduling of control files for all client groups and for the ASP and the logging thereof in the control file log. The executor sub-module handles execution of control files scheduled by the scheduler. The cleanup sub-module handles virus and other security checks on inbound data in the cleanup server 114 or storage portion 116 thereof. Inbound data is data transferred as a result of the execution of a control file from a source on the network 100A-C to a targeted one of the plurality of servers 120 (See FIG. 1). The error handler sub-module handles errors in control file execution. Errors are handled in accordance with the global and client specific error handling policies set forth either in the control file itself or as part of global error handling policies established by the ASP administrator. The migration sub-module handles migration of control files between environments in accordance with both global and client specific policies established by the ASP and client group administrators. The environmental mapper sub-module handles the mapping of a control file data source and/or target across environments.

The mass storage driver 324 controls access by each of the modules of the application manager server to the memory 106.

The recovery manager module 370 controls the recovery of an environment from an operational failure of hardware and/or software. The recovery manager module includes the following sub-modules: asset monitor sub-module 372, fail-over sub-module 374, and roll-forward sub-module 376. The asset monitor sub-module monitors the servers 120 (See FIG. 1) to determine when there is an operational failure. In the event of an operational failure the fail-over sub-module handles recovery of the existing environment from a tape storage or other backup device. The roll-forward sub-module handles the determination of the relevant control files to execute into the recovered environment.

Figure 4A:
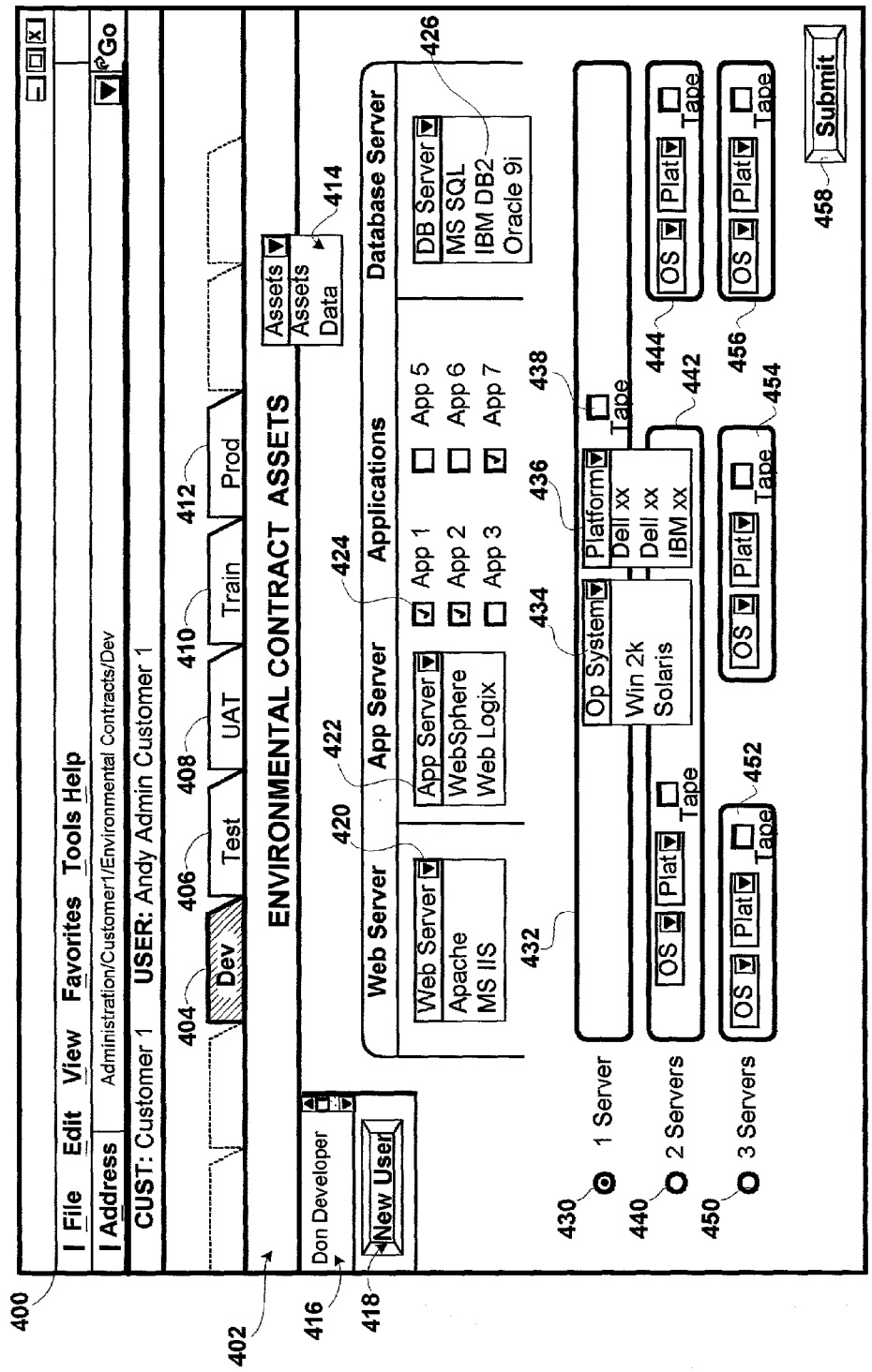
FIGS. 4A-B shows an embodiment of the graphical user interfaces associated with the setup of contracts for assets and data policies for each of the environments available to each client group.

FIGS. 4AB, 5AB, 6 A-C show the GUIs and associated tables for contract setup and control file management by the group administrator for each group and where stated by the environmental administrators for each group.

Figure 4B:
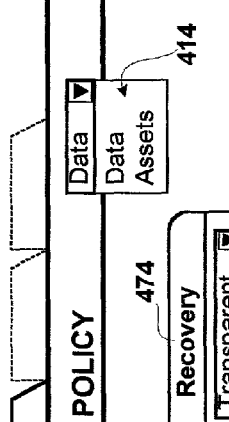

FIGS. 4A-B shows an embodiment of the GUIs associated with the setup of contracts for assets and data policies for each of the environments available to each client group. FIG. 4A shows an embodiment of the (GUI) by which the administrative member(s) of each client group enters the contract parameters which define the assets within each environment provided for the group. Access to the interface is limited to an administrative member of each corresponding client group. In the example shown 'Andy' the administrator for the client group identified as 'Customer 1' has access to the GUIs shown in FIGS. 4A-B. A browser window 400 is shown. An environment is selected via one of tab icons 404-412 for respectively: development, testing, user acceptance, training and production. The development environment tab 404 is selected. A drop-down list icon 414 is provided to select one of assets or data policies for contract setup. The asset contract portion of the list has been selected thereby resulting in the display of the environmental contract asset interface 402.

The asset contracts specify the host server assets including: architecture, hardware, platform, application software, and access for each supported environment. The administrator for each group may in an embodiment of the invention add additional administrative members with rights to setup control files within specified environment(s) within the set of environments available to the group. These additional administrators are added to list 416 via a popup form (not shown) which is presented when the new user button icon 418 is selected by the group's administrator. Radio button icons 430, 440, and 450 allow selection of different architectures for each environment. In the embodiment shown radio button icons 430, 440, and 450 select one, two and three server architectures for an environment. Drop-down list icons allow selection of a specified type of platform software, e.g. web server 420, application server 422, and database server 424. Checkbox icons 424 allow selection of a specific application.

In a single server architecture selected via radio button icon 430, all the platform and application software reside on a single server. The single physical server supports three logical servers, e.g. a web server, an application server and a database server. Checkbox icon 438 allows selection of backup of the environment via tape or some other backup medium. List icons 436, 434 allow selection of a specific server and operating system respectively. A dual server architecture is selected via radio button icon 440. In an embodiment of the invention a dual server architecture has a first physical server which supports two logical servers, e.g. the web server and the application server. This first physical server supports the web agent and web server portions of the platform software as well as the application software. The second physical server supports the database portion of the platform server and is thus the database server. For each server the specific hardware, operating system and backup policy may be selected via corresponding groups of icons 442, 444. A three server architecture is selected via radio button icon 450. In a three server architecture the web agent, application server and database server portions of the platform software reside on separate physical servers with the application itself on the application server. For each server the specific hardware, operating system and backup policy may be selected via corresponding groups of icons 452, 454, 456. Numerous variations on these and additional architectures including architectures with server clusters may be provided in alternate embodiments of the invention. The submission of the group administrator's asset contract for each environment to the application manager 102 (See FIG. 1) is initiated via the selection of submit button icon 492.

FIG. 4B shows an embodiment of the (GUI) by which the administrator(s) of each client group enters the contract parameters which define the data policies within each environment provided for the group. The development environment tab 404 is selected. The data policy portion of the drop-down list icon 414 has been selected, resulting in the display of the environmental contract data policy interface 494. The data policy contracts specify the storage policies for the repository and the execution policies for control files for each of the supported environments. Radio button icon set 460 allows the group administrator to set aging parameters, e.g. 30-90 days, for administrative data copies stored in the repository 258 (See FIG. 2). Radio button icon set 462 allows the group administrator to set aging parameters, e.g. 30-90 days, for prior versions of control files 254 stored in the memory 106 (See FIGS. 1-3).

Drop-down list icon sets 470, 472, 474 allow administrative selection of control file execution policies for application maintenance ADTs including upgrades, patches and recoveries on web server 464, application server 466 and database server 468. In the embodiment shown the available selections for control file execution policy are: 'transparent', 'notes' only, and 'notify and hold'. A selection of 'transparent' avoids notification of the group administrator when a control file is executed. Conversely, a selection of 'notes' results in the application manager notifying the group administrator each time a control file with the specified type of data transfer on the specified server type is executed. Notification may be via e-mail or other supported method. A selection of 'notify and hold' avoids execution of the control file with the specified type of data transfer on the specified server type until the group administrator has been notified of the pending execution and has edited the control file to release the 'hold' thereby freeing it for scheduled execution.

Drop-down list icon sets 484, 486, 488 and 490 allow administrative selection of control file execution policies for ADTs including: outbound/inbound customer transfers 484, 486 respectively and outbound/inbound $3^{rd}$ party transfers 488, 490 respectively. An outbound administrative data transfer is initiated by execution of a control file which specifies a client group or $3^{rd}$ party as a target for a data transfer the data source for which is a selected one of the servers 120 (See FIG. 1). An inbound data transfer has an administrative data target which is on a hosted environment on one of servers 120 (See FIG. 1). In the embodiment shown the available selections for control file execution policy are: 'transparent', 'notes' only, and 'notes and hold'. Client data execution policies may be specified for discrete data types including in the embodiment shown: table data 482, tables 480, and processes 478. An example of table data is the address information for customers in an CRM or other application. An example of a table is a tax table in a financial management application. An example of a process is a script, executable file or query for downloading or uploading data from a database. The submission of each group administrator's data policy contract for each environment to the application manager 102 (See FIG. 1) is initiated via the selection of submit button icon 496.

FIGS. 5A-B show an embodiment of the asset and data policy tables respectively for storing contract parameters entered via the GUIs shown in FIGS. 4A-B respectively. These tables contain contract parameters for all client groups and all supported environments within each client group. Contract parameters may be stored in a range of alternate data structures including relational tables and objects.

The asset table 500 contains contract parameters entered by the administrator for each client group via the GUI shown in FIG. 4A. The asset table is shown with columns 502-516 defining specific contract parameters for an asset contract for the particular customer and environment shown in rows 518-528. In this embodiment of the invention an asset contract is defined by the following parameters: customer 502; environment 504; physical path 506 to the server(s) supporting the environment; hardware platform 508 including operating system and backup policy; software platform 510; hosted application 512, e.g. CRM or financial management application; environment status 514, e.g. available, failed, recovered; and environment map 516. The map field records for each environment a logical to physical mapping which is logically consistent across each of the environments available to a client group. The consistency of the mapping is achieved by the environmental mapper sub-module 344 which is part of the control file manager module 330 shown in FIG. 3. Consistent mapping across environments allows semi-automatic migration of control files from one environment to the next at the direction of the client group or ASP administrator. In an embodiment of the invention the map field is updated dynamically with the logical-to-physical mapping of an administrative data source or target which lies within the hosted environment by the environmental mapper at the time a control file migration request is entered. Control file migration between environments will be discussed in greater detail in connection with the following FIGS. 6A, 8A and accompanying text. The data policy table 550 contains contract parameters entered by the administrator for each client group via the GUI shown in FIG. 4B. The data policy table is shown with columns 552-568 defining specific contract parameters for a data policy contract for the particular customer and environment shown in rows 570-576. In this embodiment of the invention a data policy contract is defined by the following parameters: customer 552 and environment 554 for: application data transfers including; upgrade 556, patch 558 and recovery 560 and for client data transfers including; outbound data transfers to a customer 562; inbound data transfers from a customer 564, outbound data transfers to a $3^{rd}$ party 566 and inbound data transfers from a $3^{rd}$ party 568.

Figure 6A:
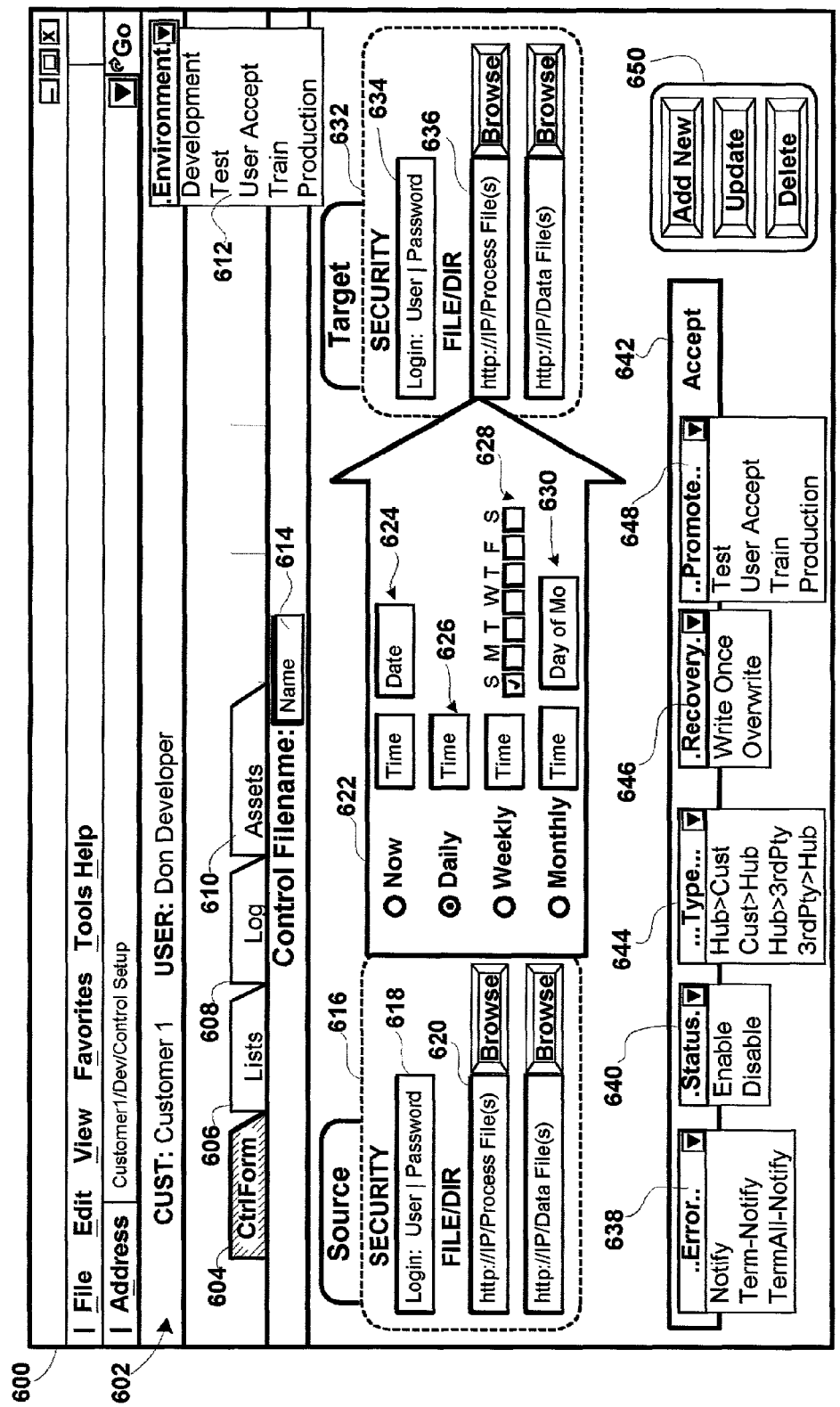
FIGS. 6A-C show embodiments of the graphical user interface associated with client setup, display and scheduling of control files for administrative data transfers between associated application servers and selected clients as shown in FIG. 1.
Figure 6B:
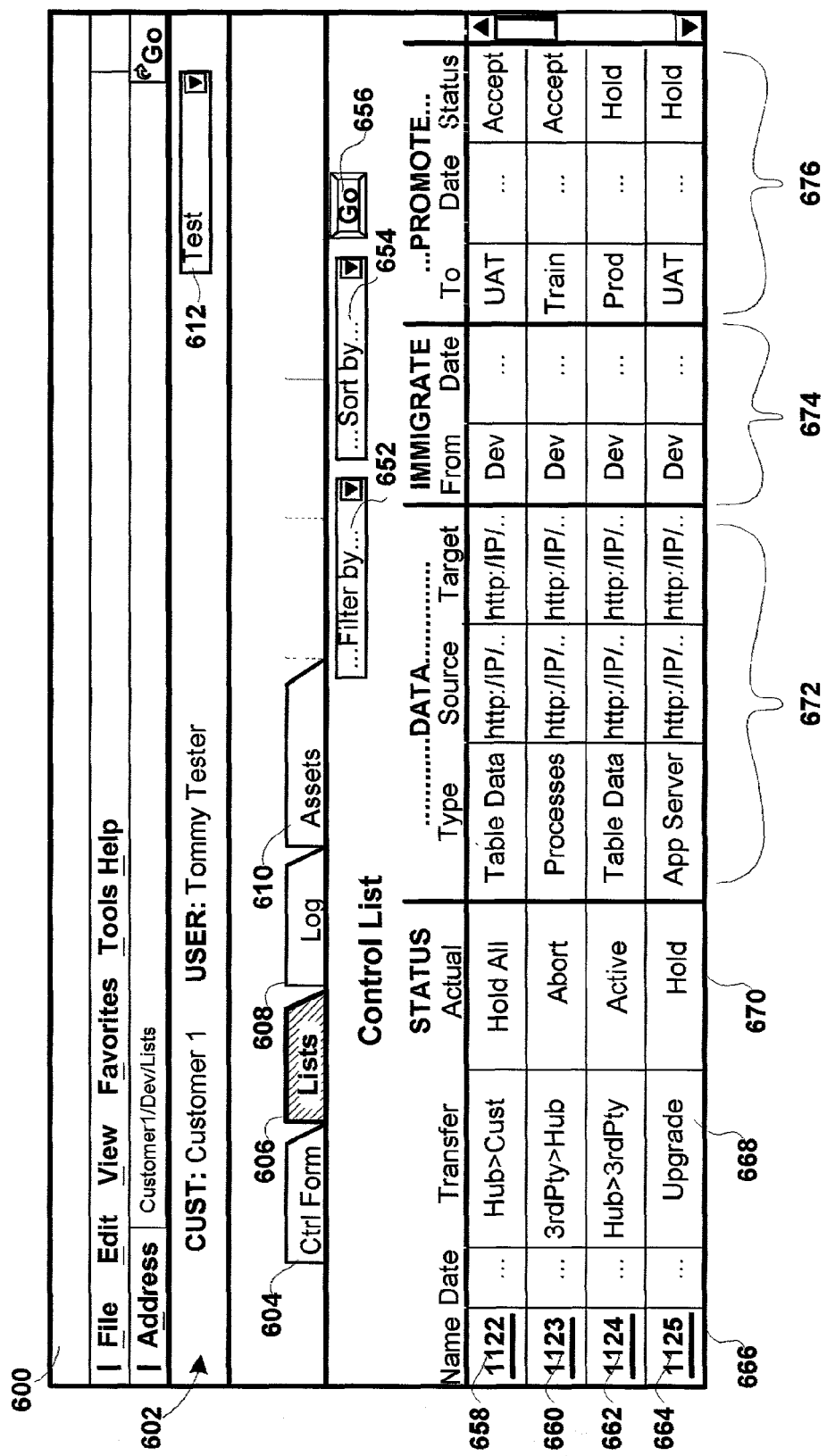
Figure 6C:
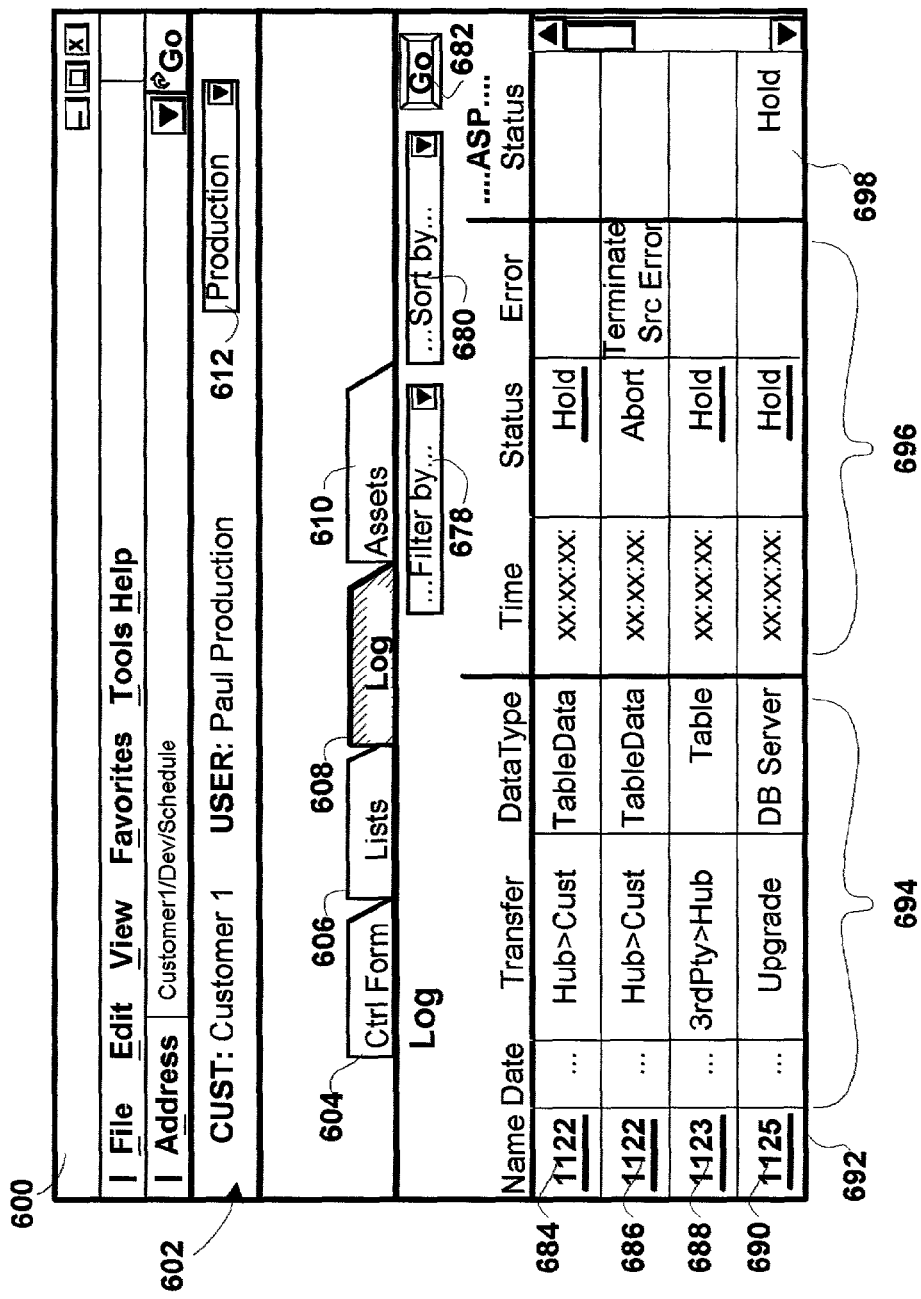

FIGS. 6A-C show embodiments of the GUI associated with client setup, display and scheduling of control files by the administrator of each client group for administrative data transfers between associated application servers and selected clients as shown in FIG. 1. Access to these control file GUIs is limited to those employees of the group with access privileges as determined by the group administrator during contract setup (See new user list and add icons 416-418 in FIG. 4A). These designated members of a group will be referred to as environmental administrators for a group.

FIG. 6A shows an embodiment of the graphical user interface (GUI) for setup of control files. A browser window 600 is shown. An employee 'Don' of the client group identified as Customer 1 is shown accessing the GUI's appropriate to the environment to which Don has access. That environment, e.g. the development environment, is selected via drop-down list 612. Tab icons 604, 606, 608, 610 are provided for selecting within the environment: the control file form 604, the list of control files 606; the log of previously scheduled control file instances 608 and the contracted assets 610. The control file form tab 604 is selected resulting in the display of the control file form. The name of the control file being added/updated/deleted is shown in input box icon 614. For each control file a data source, a schedule, and a data target are input. Data source parameters 616 include: security parameters 618 such as user name and password to login to the data source; and path information 620 either absolute or relative as to the data source. Data target parameters 632 include: security parameters 634 such as user name and password to login to the data source; and path information 636 either absolute or relative as to the data target. In an embodiment of the invention the environmental mapper sub-module 344 of the control file manager 330 presents a logical directory and/or path structure for whichever of the client data source/target resides within the hosted environment. The actual physical mapping differs between each of the environments to which each group has access. The environmental mapper handles the logical-to-physical mapping for each control file either at time of setup or execution of a control file.

Scheduling of a control file is set up in scheduling block 622. Scheduling may call for a single execution, or repeated executions. In the embodiment shown icons 624 specify a single execution of the named control file at a specified data and time. Icons 626 specify a repeated daily execution of the control file at a specified time. Icons 628 specify a repeated weekly execution of the control file at a specified time and day(s). Icons 630 specify a repeated monthly execution of the control file at a specified time and day of the month. Additional parameters may be required for a control file including: error handling, enablement, typing, recovery, and migration.

Execution of control files can be carried out by the application manager alone without the requirement of any corresponding program code on either the data source or data target. This is accomplished by the inclusion in the data source and data target of each control file of the path and security information required to access both the data source and data target.

Error handling parameters determine what to do when a control file fails to execute. Drop-down list icon 638 allows each control file to be tagged with error handling policies, e.g.: notification, terminate execution and notify, or terminate all and notify. A choice of the 'notification' option results in the notification of the group administrator and/or environment administrator within the group of an error during the execution of a control file. A choice of the 'terminate and notes' option results in notification and termination of further attempts by the application manager to execute the scheduled instance of the control file, but does not prevent scheduling of future instances of the control file. A choice of the 'terminate all and notes' option results in notification and termination of execution attempts on all scheduled instances of the subject control file.

A control file may be enabled and disabled via a corresponding selection in drop down list icon 640. Control files may be typed via drop-down list 644 as to: the direction, e.g. inbound and outbound, and source/target for the data, e.g. $3^{rd}$ party or customer.

Control file execution parameters during the roll-forward portion of a recovery from a failure of an environment may be selected from drop-down list icon 646. Exemplary choices include: 'write once' or 'overwrite'. Roll-forward refers to that phase of recovery after data on the effected web, application and/or database server has been failed-over to a working platform. During the roll-forward phase control files previously executed after the date and time up to which the environment is recovered will be re-executed subject to certain conditions. One of those conditions is determined by the roll-forward policy selected by the environment administrator at time of control file setup. Where for example, the control file is tagged with a 'write once' and the data transfer called for by the control file is an inbound data transfer, the control file will not be re-executed if the target file exists in the recovered environment. Alternately, where the control file is tagged with 'overwrite' the control file will be re-executed whether or not the target file exists in the recovered environment.

In an embodiment of the invention, migration of a control file may be requested by selecting an environment to which to promote the subject control file. Promotion need not be to a higher level environment. This may be accomplished via drop-down list icon 648 on which the available environments; e.g. test, user acceptance, training and production are listed. Not all promotion requests will be immediately set up for migration and or for scheduling in the environment to which they are promoted. There may be additional ASP contractual overrides on control file migration. These may result in promotion requests to selected environments, e.g. production being routinely placed on hold until specifically approved by the ASP. This feature of the application manager will be discussed in greater detail in connection with the ASP administrative interfaces shown in FIGS. 7A, 8A-C and accompanying text. The status of a migration request, e.g. 'accept' or 'on hold', is displayed in field 642 which is part of the control file form 604. Icon set 650 allows the environmental administrator to add new control files with the above discussed parameters and to delete or edit existing control files. The data entered via the control file form is retained within the memory 106 as individual control files 254 (See FIGS. 2,3).

FIG. 6B shows an embodiment of the graphical user interface (GUI) for listing control files. Another employee 'Tommy' of the client group identified as Customer 1 is shown accessing the GUI's appropriate to the environment to which Tommy has access. That environment, e.g. the testing environment, is selected via drop-down list 612. The tab icon 606 is selected thus resulting in the display of the control file list. Drop down list icons 652, 654 allow the selection of filter and sorting criteria respectively for the control file list. A 'Go' icon 656 initiates such filtering and sorting. Each row on the list, e.g. rows 658-664, shows for the test environment of customer 1 each unique control file and various parameters related thereto. Each of columns 666-676 lists the various parameters which include: control file ID 666; transfer type 668; execution status 670; data transfer parameters 672 such as client data type, source and target paths; immigration parameters 674 such as prior environment and date of prior promotion; and promotion parameters 676 such as date of migration request, environment to promote to, and ASP over-ride status. Any control file on the list can be selected for editing or deletion via a hyperlink associated with the control file number in each row. This results in the display of the corresponding control file in the control file form shown in FIG. 6A. The list shown in FIG. 6B is assembled by the interface module 300 using the control files 258 for the client group stored in the memory 106 (See FIGS. 2-3).

FIG. 6C shows an embodiment of the graphical user interface (GUI) for displaying the log of control file instances. Another employee 'Paul' of the client group identified as Customer 1 is shown accessing the GUI's appropriate to the environment to which Paul has access. That environment, e.g. the production environment, is selected via drop-down list 612. The tab icon 608 is selected thus resulting in the display of the log of previously scheduled control file instances. Drop down list icons 678, 680 allow the selection of filter and sorting criteria respectively for the control file list. A 'Go' icon 682 initiates such filtering and sorting. Each row on the list, e.g. rows 684-690, show for the production environment of customer 1 each instance of a scheduled control file and various parameters related thereto. Each of columns 692-698 lists the various parameters for the scheduled control files which include: control file ID 692; transfer and data types 694; execution status 696 such as time, status, and error condition; and ASP migration over-ride status 698. Hyperlinks in the execution status columns 696 allow the client administrator to remove a 'hold' on a particular instance of a control file shown in the log. Additionally, any control file on the log can be selected for viewing further details via a hyperlink associated with the control file number in each row. This results in the display of the corresponding control file in the control file form shown in FIG. 6A. The schedule shown in FIG. 6C is assembled by the interface module 300 using the control file log 256 (See FIGS. 2-3).

The GUI associated with the asset tab icon 610 is not shown but would resemble the asset contract GUI shown in FIG. 4A. In an embodiment of the invention only the group administrator and not the group's environmental administrators would have editing capability as to the asset contracts. The environmental administrators access would be limited to viewing the asset contract.

Figure 7A:
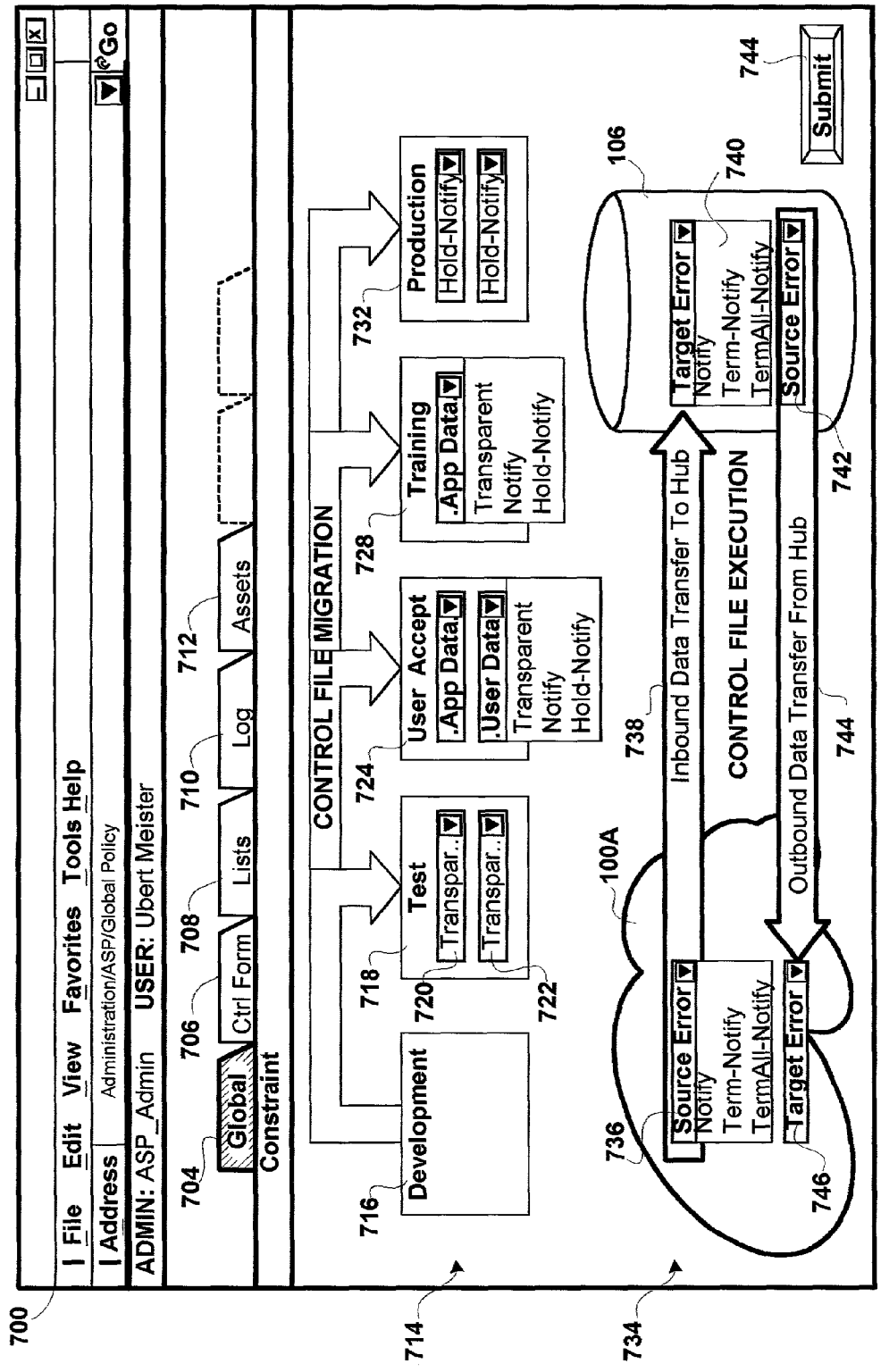
FIG. 7A shows an embodiment of the graphical user interface associated with setup of global contract policies for control file migration and error handling as established by the administrator of the application manager shown in FIG. 1.

The following FIGS. 7A-C, 8A-C show the GUIs and associated tables for contract and control file management by the ASP administrator. FIG. 7A shows an embodiment of the GUI associated with setup of global contract policies for control file migration and error handling by the ASP administrator of the application manager shown in FIG. 1. A browser window 700 is shown. Tab icons 704, 706, 708, 710 and 712 are provided for selecting: global policy form, control file form, global log of previously scheduled control file instances, global schedule and global assets respectively. An ASP administrator 'Ubert Meister' is shown accessing the global policy form via the selection of tab 704. The global policy form includes a migration policy portion 714 and an error policy portion 734.

The migration policy portion of the global policy form includes icons representing each of the supported environments, e.g. development 716, test 718, user acceptance 724, training 728, and production 732. Within each environment global migration policy may be specified for various types of control files. In the embodiment shown one migration policy may be selected for control files which control application maintenance ADTs and another migration policy may be selected for control files which control EDT ADTs. Within the development environment icon 716 the dropdown list icons 720, 722 allow the ASP administrator to select global migration policy for application maintenance and EDT ADTs respectively. Similar dropdown list icons are present within the user acceptance, training and production environment icons. The selectable migration policies within each dropdown list icon are globally applied to control file migration requests of the corresponding type across all the client groups. In the embodiment shown the selectable global migration policies are: 'transparent', 'notes' and 'hold and notes'. A selection of 'transparent' avoids notification of the ASP when a control file of the corresponding type is migrated to the requested environment by the application manager. This policy may be appropriate where the target environment of the migration request is a lower level environment such as 'Test'. Alternatively, the ASP may where the targeted environment is 'Production', require notification and hold for migration requests for all types of control files. The hold portion of the policy avoids scheduling and execution of the control file in the environment to which it is migrated until the ASP has checked the control file and removed the hold. This policy is set by a selection of 'hold-notify' on the corresponding dropdown list icon.

The error policy portion 734 of the global policy form allows global error handling policies to be specified for all control file types. Control files specify a data source and target. Errors may arise at the data source due to login failure, an incorrect path or unavailability of data. Errors may arise at the data target due to login failure or an incorrect path. Culpability of the ASP for errors during control file execution may vary depending on whether the control file specifies an inbound or an outbound data transfer. For an inbound data transfer the target is one of the servers 120 for which the ASP is responsible, and vice versa for outbound data transfers. The culpability of the ASP is high for errors arising at the data source on outbound data transfers and at the data target on inbound data transfers. The culpability of the ASP is reduced for source errors and target errors on inbound and outbound data transfers respectively since the ASP does not control $3^{rd}$ party, vendor, or client platforms on which the data source or target resides. The GUI on the error policy portion includes inbound data transfer icon 738 with a dropdown list source icon 736 on an icon corresponding with network 100A (See FIG. 1) and a dropdown list target icon 740 on an icon corresponding with memory 106 of the application manager (See FIG. 1). An outbound data transfer icon 744 is also shown with a dropdown list source icon 742 superimposes on the memory and a dropdown list target icon 746 superimposed on the network. In the embodiment shown the selectable global error handling policies are: 'notes', 'terminate and notes' and 'terminate all and notify'. A selection of 'notes' results in notification of the ASP of the error but does not terminate further attempts by the application manager to execute the scheduled instance of the control file which produced the error nor the scheduling of future instances of the control file. This policy may be appropriate where ASP culpability is low such as a target error on an outbound data transfer. Alternatively, the ASP may select 'terminate and notify' which results in both notification of the ASP as well as termination of further attempts by the application manager to execute the scheduled instance of the control file which produced the error. This option does not however, terminate scheduling of further instances of the same control file. A selection of 'terminate all and notes' results in both notify of the ASP as well as a termination of all instances of the control file which produces the error. This error handling option may be appropriate where ASP culpability is high such as target error on an inbound data transfer. The submit button icon 744 allows the ASP administrator to submit the global policy constraints to the application manager.

FIGS. 7B-C show an embodiment of the migration and error policy tables respectively for storing global contract policies entered via the GUI shown in FIG. 7A. The migration table 750 includes rows 758-766 for each of the supported environments and columns defining the environment fields 752, application maintenance ADT migration policy fields 754 and the EDT ADT migration policy fields 756. Hyperlinks in each of the entries in the fields of column 752 result in the display of the global policy form shown in FIG. 7A. The error policy table 770 includes rows 780-782 for inbound and outbound data transfer policy and columns defining: the data flow direction fields 772, the source error policy fields 774, and the target error policy fields 776. Hyperlinks in each of the entries in the fields of column 772 result in the display of the global policy form shown in FIG. 7A.

Figure 8A:
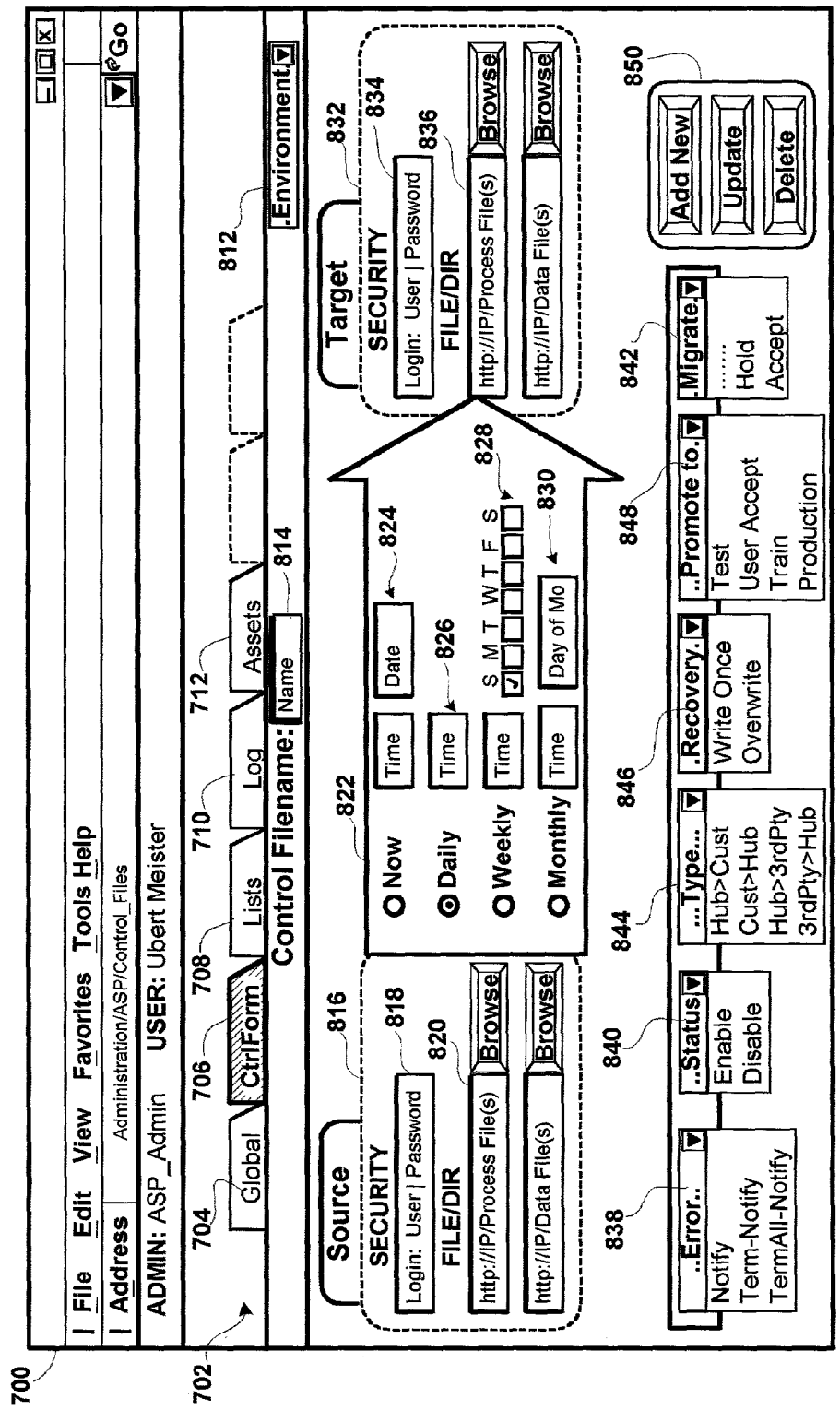
FIGS. 8A-C show embodiments of the graphical user interface associated with administrative setup, display and scheduling of control files by the administrator of the application manager shown in FIG. 1.
Figure 8B:
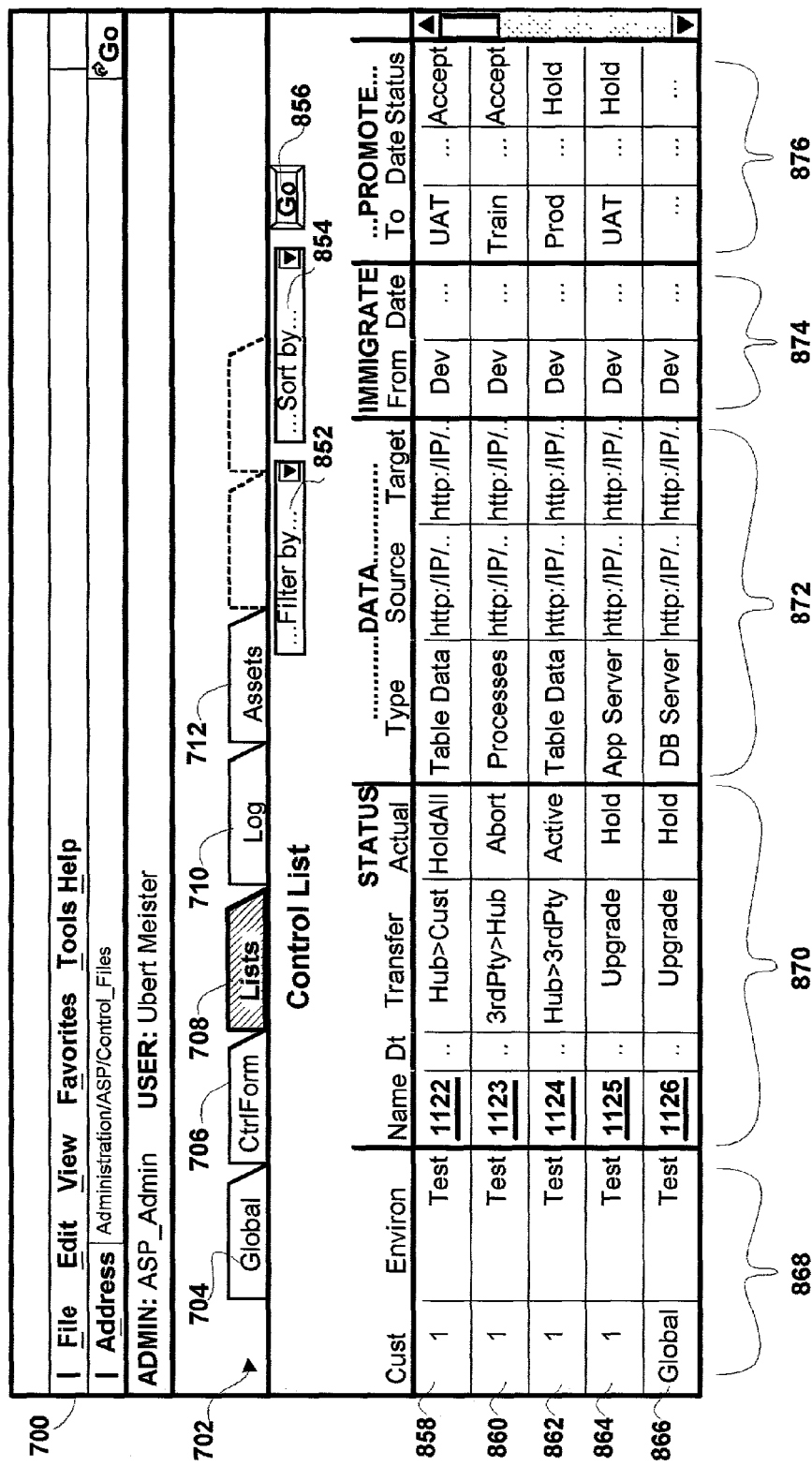
Figure 8C:
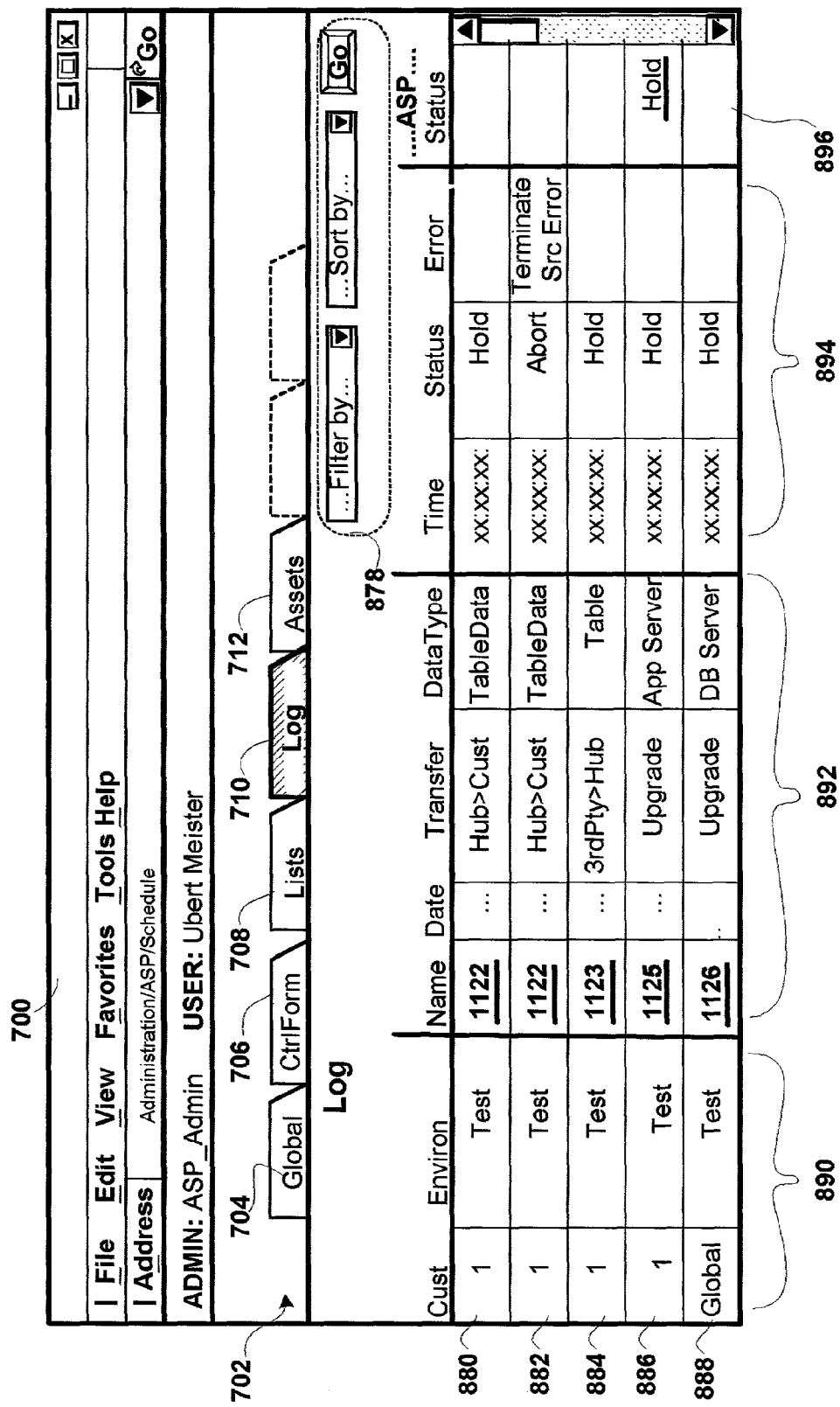

FIGS. 8A-C show embodiments of the graphical user interface associated with administrative setup, display and scheduling of control files by the administrator of the application manager shown in FIG. 1. The interfaces closely resemble those set forth in FIGS. 6A-C and accompanying text. An important distinction however, is that the control files accessible via the GUIs of FIGS. 8A-C are not limited to a single client group. Instead the ASP administrator may access all control files, across all environments and client groups, via these interfaces.

FIG. 8A shows an embodiment of the graphical user interface (GUI) for setup of control files. A browser window 700 is shown. The ASP administrator 'Ubert Meister' is shown accessing the control file form via the selection of tab 706. The targeted environment is selected via the dropdown list icon 812. The name of the control file being added/updated/deleted is shown in input box icon 814. For each control file a data source, a schedule, and a data target are input. Source parameters 816 include: security parameters 818 such as user name and password to login to the data source; and path information 820 either absolute or relative as to the data source. Target parameters 832 include: security parameters 834 such as user name and password to login to the data source; and path information 836 either absolute or relative as to the data target. In an embodiment of the invention the environmental mapper sub-module 344 of the control file manager 330 presents a logical directory and/or path structure for whichever of the client data source/target resides within the hosted environment. The actual physical mapping differs between each of the environments to which each group has access. The environmental mapper handles the logical-to-physical mapping for each control file either at time of setup or execution of a control file.

Scheduling of a control file is set up in scheduling block 822. Scheduling may call for a single execution, or repeated executions. In the embodiment shown icons 824 specify a single execution of the named control file at a specified data and time. Icons 826 specify a repeated daily execution of the control file at a specified time. Icons 828 specify a repeated weekly execution of the control file at a specified time and day(s). Icons 830 specify a repeated monthly execution of the control file at a specified time and day of the month. Additional parameters may be required for a control file including: error handling, enablement, typing, recovery, and migration.

Execution of control files can be carried out by the application manager alone without the requirement of any corresponding program code on either the data source or data target. This is accomplished by the inclusion in the data source and data target of each control file of the path and security information required to access both the data source and data target.

Error handling parameters determines what to do when a control file fails to execute. Drop-down list icon 838 allows each control file to be tagged with error handling policies, e.g.: notification, terminate execution and notify, or terminate all and notify. A choice of the 'notification' option results in the notification of the ASP administrator of an error during the execution of a control file. A choice of the 'terminate and notes' option results in notification and termination of further attempts by the application manager to execute the scheduled instance of the control file, but does not prevent scheduling of future instances of the control file. A choice of the 'terminate all and notify' option results in notification and termination of execution attempts on all scheduled instances of the subject control file.

A control file may be enabled and disabled via a corresponding selection in drop down list icon 840. Control files may be typed via drop-down list 844 as to: the direction, e.g. inbound and outbound, and source/target for the data, e.g. $3^{rd}$ party or customer. Parameters for a control file execution during the roll-forward portion of a recovery from a failure of an environment may be selected from drop-down list icon 846. Exemplary choices include: 'write once' or 'overwrite'.

Migration of a control file may be requested by selecting an environment to which to promote the subject control file. This may be accomplished via drop-down list icon 848 on which the available environments; e.g. test, user acceptance, training and production are listed. Not all promotion requests will be immediately set up for migration and or for scheduling in the environment to which they are promoted. There may be additional ASP overrides on control file migration. These may result in promotion requests to selected environments, e.g. production being routinely placed on hold until specifically approved by the ASP. Dropdown list icon 842 accessible only to the ASP administrator allows the ASP administrator to release a hold on a control file thereby allowing its scheduling.

Icon set 850 allows the environmental administrator to add new control files with the above discussed parameters and to delete or edit existing control files. The data entered via the control file form is retained within the memory 106 as individual control files 254 (See FIGS. 2,3).

FIG. 8B shows an embodiment of the graphical user interface (GUI) for listing control files. The tab icon 708 is selected thus resulting in the display of the global control file list. Drop down list icons 852, 854 allow the selection of filter and sorting criteria respectively for the control file list. Filter criteria include: environment, status, customer etc. A 'Go' icon 856 initiates such filtering and sorting. Each row on the list shows the control files for all customers and environments, with rows 858-866 referenced. Each of columns 868-876 lists the various parameters which include: customer and environment 868; control file ID, transfer type and status 870; administrative data type, source and target 872; date and environment from which immigrated 874; and promotion parameters 876 including status of outstanding promotion requests. Any control file on the list can be selected for editing or deletion via a hyperlink associated with the control file number in each row. This results in the display of the corresponding control file in the global control file form shown in FIG. 8A. The list shown in FIG. 8B is assembled by the interface module 300 using the control files 258 stored in memory 106 (See FIGS. 2-3).

FIG. 8C shows an embodiment of the graphical user interface (GUI) for displaying the log of previously scheduled control file instances across all client groups. The tab icon 710 is selected thus resulting in the display of the global control file log. Drop down list icons 878, 880 allow the selection of filter and sorting criteria respectively for the logged control file instances. A 'Go' icon 882 initiates such filtering and sorting. Filter criteria include: environment, status, customer etc. Each row on the list, e.g. rows 880-888, show for each instance of all scheduled control file and various parameters related thereto. Each of column groups 890-896 lists the various parameters for the scheduled control files which include: customer and environment 890; control file ID 892, transfer and data types 892; execution status 894 such as time, status, and error condition; and ASP migration over-ride status 896. In an embodiment of the invention hyperlinks in the ASP migration over-ride status fields 896 allow the ASP administrator to remove a 'hold' on a particular instance of a control file shown in the log. Any control file on the schedule can be selected for viewing further details via a hyperlink associated with the control file number in each row. This results in the display of the corresponding control file in the global control file form shown in FIG. 8A. The log shown in FIG. 8C is assembled by the interface module 300 using the control file log 256 (See FIGS. 2-3).

The GUI associated with the asset tab icon 712 is not shown but would resemble the asset contract GUI shown in FIG. 4A. All asset contracts and corresponding asset status for all client groups and environments are accessible to the ASP administrator.

Figure 9A:
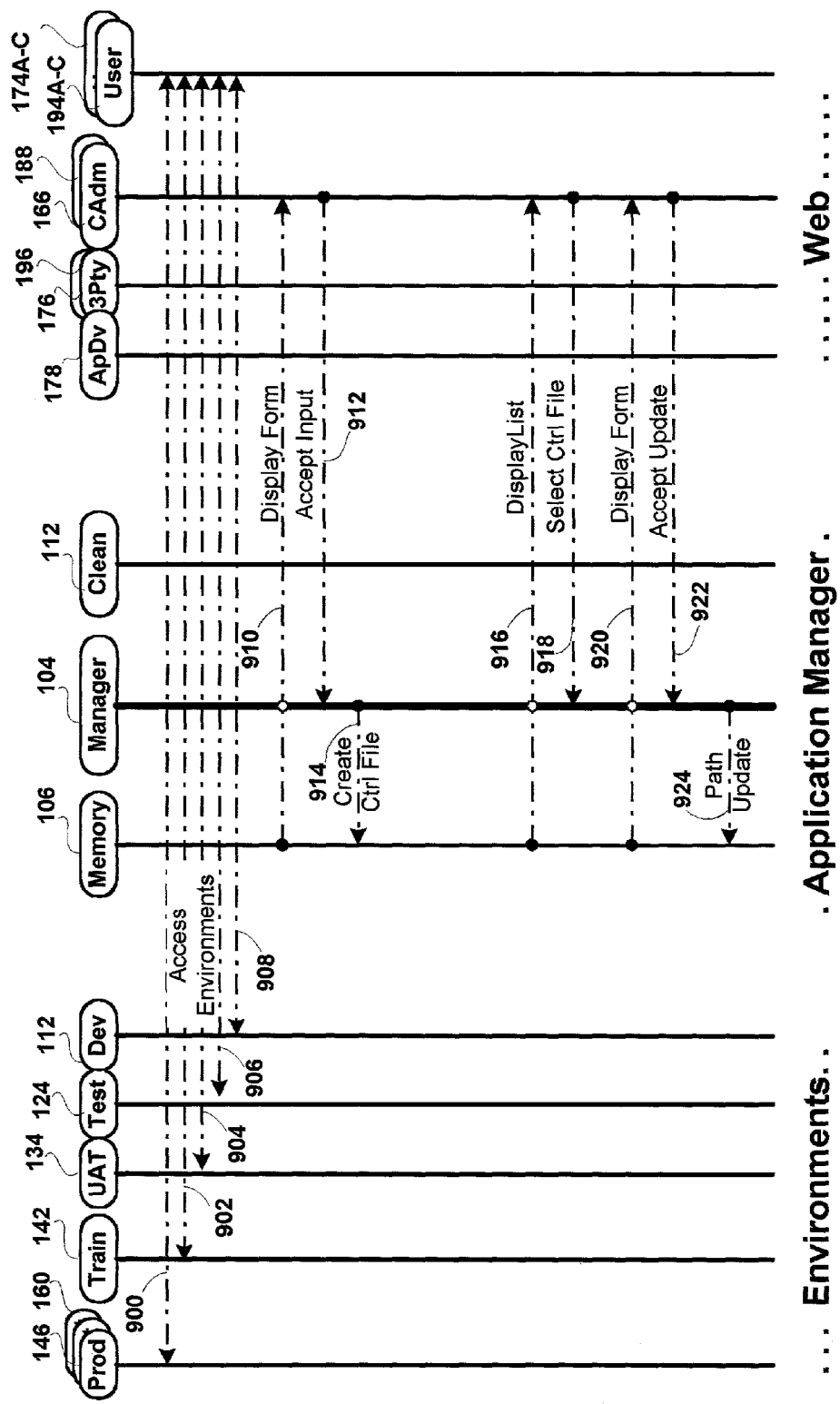
Figure 9B:
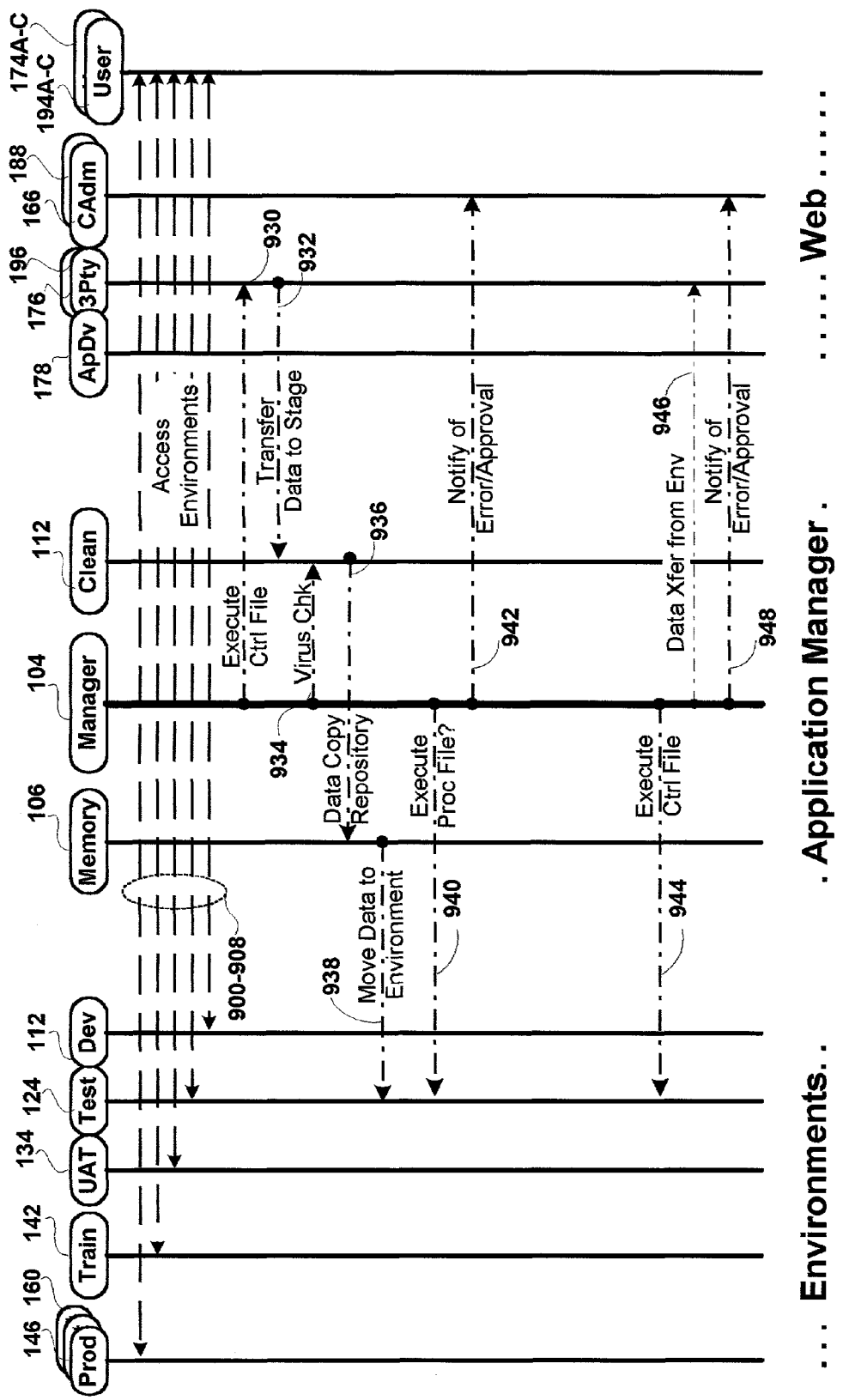

FIGS. 9A-C are candlestick diagrams of embodiments of data transfers associated with control file setup, execution, and recovery in the embodiment of the invention shown in FIG. 1. Candlesticks are shown for: clients 174A-C and 194A-C; customer administrators 166-168; $3^{rd}$ parties 176, 196; application developers 178; cleanup server 112; application manager 104; memory 106; development environment 112; test environment 124; user acceptance environment 134; training environment 142; and production environments 146, 160 (See FIG. 1). In the following detailed discussions of FIGS. 9A-C reference numbers between 100 and 198 may be found in FIG. 1.

FIG. 9A shows the steps associated with control file setup and migration. Arrows 900-908 indicate access by corresponding members of all the client groups to the corresponding ones of their groups environments, during control file setup and migration. Control file setup is initiated in step 910 via delivery of a control file form GUI 910 delivered from memory 106 by the application manager 104 to the client administrator 160 for example. In step 912 the client administrator submits the control file form input to the application manager, which stores the input parameters in step 914 in a corresponding control file in memory 106.

Control file editing, including a migration request, is initiated in steps 916 with delivery of a control file list GUI 916 delivered from memory 106 by the application manager 104 to the client administrator 160 for example. In step 918 the client administrator selects a control file from the list. This information when transmitted to the application manager results in the display in step 920 of the control file form GUI with the corresponding parameters for the selected control file. In step 922 the client administrator submits updated parameters via the form. The input is received by the control manager. If the control manager determines there is a migration request updated path information for the new environment is entered automatically by the environment mapper 344 (See FIG. 3) and the updated control file is stored in memory 106. In an alternate embodiment of the invention environmental mapping is only performed at time of execution of the control file rather than at time of entering the migration request.

FIG. 9B shows the steps associated with control file execution for inbound and outbound ADTs. Arrows 900-908 indicate access by corresponding members of all the client groups to the corresponding ones of their groups environments, during control file execution. Processing of control files the execution of which results in an inbound data transfer is shown in steps 930-942.

Execution of a control file which specifies an inbound data transfer begins with step 930. The application manager executes the next scheduled instance of a control file. The control file in this example calls for an inbound data transfer from $3^{rd}$ party 176 for example. Using the login and path information for the data source on the $3^{rd}$ party server the application manager initiates an inbound data transfer 932. The data is transferred to the cleanup server 112. In step 934 the application manager 104 initiates a virus check on the inbound data in the cleanup server. Next, the application manager moves a copy of the inbound data to the repository within memory 106. Then in step 938 the application manager using the target information in the control file and any re-mapping thereof by the environmental mapper 344 (See FIG. 3) moves the data to the target location on the environment specified in the control file, which in the example shown is the test environment 124. Then in step 940 any accompanying process file the execution of which is required to inject the transferred data into the database, or application is executed at the initiation of the control manager. The application manager has full access rights to all environments over a VPN or other secure link. In step 942 the application manager determines whether either the ASP or the client administrator has set their global or contractual data policies respectively to require notification when a control file is executed. If they have then via e-mail or other communication method the notice is delivered. Additionally, if the application manager detects an error in the execution of the control file then notice of the error may also be delivered.

Execution of a control file which specifies an outbound data transfer begins with step 944. The application manager executes the next scheduled control file instance. The control file in this example calls for an outbound data transfer from a data source in one of the environments, e.g. test environment 124. The extracted data is passed in step 946 by the application manager to either the corresponding client or a 3$^{rd}$ party business partner 176 identified as the data target in the control file. In step 948 the application manager determines whether either the ASP or the client administrator has set their global or contractual data policies respectively to require notification when a control file is executed. If they have then via e-mail or other communication method the notice is delivered. Additionally, if the application manager detects an error in the execution of the control file then notice of the error may also be delivered.

FIG. 9C shows the steps associated with control file execution for recovery and roll-forward of a failed environment. Failure of an environment may be caused by either hardware or software failures. Arrows 900, 904-908 indicate access by corresponding members of all the client groups to the corresponding ones of their groups environments, during control file execution. The arrow 902 between clients 174A-C, 194A-C and the training environment is broken, indicating that there may be at least temporary unavailability of a failed environment to clients during a recovery. Unavailability of an environment can be avoided with a clustered architecture with a load balancing switch which directs traffic away from a failed server until recovery is complete. In step 950 the application manager 104 detects a failure in the training environment. In step 952 notification of failure is passed to both the client administrators as well as affected clients. In steps 954-956 the application manager determines the time at which the last full or differential backup was made and initiates restoration from tape or other backup system. The restoration may be made on the failed server(s) if operational or on a selected failover server(s). Next in step 958 the application manager 104 determines from the log 256 stored in memory 106 which control files had a data source or target on the failed environment and were executed in the roll-forward interval. The roll-forward interval spans the time between the last full/differential backup and the time at which failure was detected. Absent the re-execution of the control files executed in the roll-forward interval, the recovered environment will not replicate the environment that failed as faithfully as is possible. Once it is determined in step 960 that restoration is complete, roll-forward is commenced in step 962. Roll-forward includes selecting from the control files executed in the roll-forward interval those control files which may, consistent with the data policy of both the ASP and corresponding client, be re-executed during roll-forward. Data policy for the client is in the embodiments of the invention shown in FIG. 4B and FIG. 6A set at both a contract level as well as within each control file (See FIG. 4B, reference 474; FIG. 6A, reference 646). Data policy for the ASP is in the embodiments of the invention shown in FIG. 8A set within each control file (FIG. 8A, reference 846). In step 964 the selected ones of the control files having execution dates falling in the interval are re-executed in the same sequence as in the original scheduling. For control files which generate an inbound data transfer, the data source is remapped in act 964 by the environmental mapper 344 (See FIG. 3) sub-module of the application manager to a copy of the corresponding data source in the repository 258 which is part of memory 106. This re-mapping avoids having to access data sources on the network 100A during roll-forward. This speeds up roll-forward and assures the fidelity of the recovered environment with the environment as is existed before failure. In act 966 control files generating an outbound data are executed to transfer data to corresponding data targets on the network. Once the roll-forward portion of recovery is complete the affected client administrator(s) and any affected clients are notified of the completion of recovery.

Figure 10:
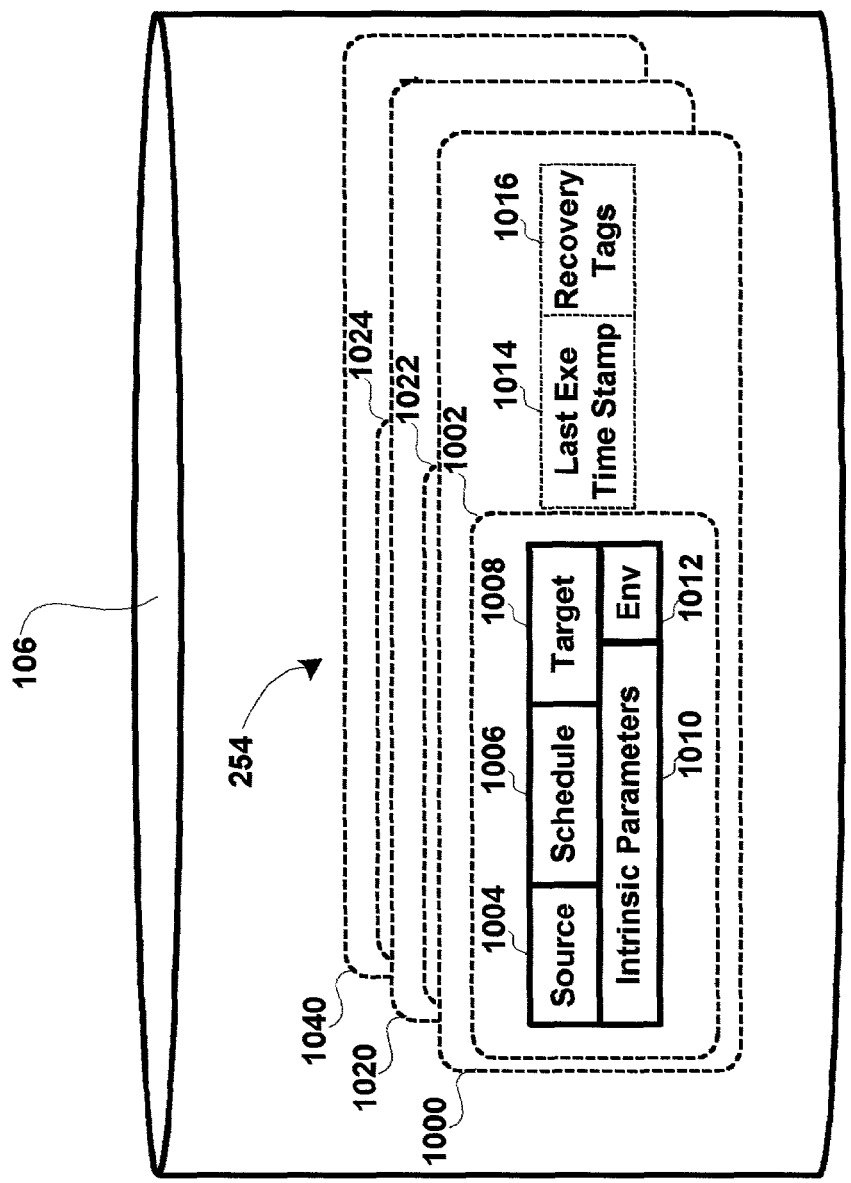
FIG. 10 shows an embodiment of the data structures associated with the scheduling of the control files stored on the memory of the application manager shown in FIG. 1.

FIG. 10 shows an embodiment of the data structures associated with the scheduling of the control files stored on the memory of the application manager shown in FIG. 1. A plurality of control files 1000, 1020, 1040 each with a corresponding cores containing parameters entered by the administrator via the GUIs shown in FIGS. 6A, 8A and with tags and time stamps to aid in scheduling. Control file 1000 includes a core 1002, a time stamp 1014 and recovery tags 1016. The core contains the parameters entered by the administrator during setup of the control file. The source parameters 1004 include login and path information for the data source (See FIG. 6A reference 616 and FIG. 8A reference 816). The target parameters 1008 include login and path information for the data target (See FIG. 6A reference 632 and FIG. 8A reference 832). The schedule parameters 1006 contain the time and frequency, e.g. now, daily, weekly, monthly, for scheduling execution of the control file (See FIG. 6A reference 622 and FIG. 8A reference 822). The intrinsic parameters 1010 are unique to the control file and determine the handling of the control file during execution, errors, recovery and migration. (See FIG. 6A references 638-648 and FIG. 8A references 838-848). The environmental parameter 1012 indicates the environment(s) in which the control file is to be executed. The time stamp 1014 in this embodiment of the invention is a tag on the control file which records the time of last execution of the control file. This tag allows repeated executions of the control file at the appropriate frequency and time. As each control file is executed the time of execution and any errors encountered are all recorded in the log 256 (See FIG. 2) which is a list of previously scheduled control files. The recovery tag 1016 contains parameters relevant to the handling of the control file during recovery and roll-forward as will be discussed in greater detail in connection with the following process flow in FIG. 11B and accompanying test.

Figure 11A:
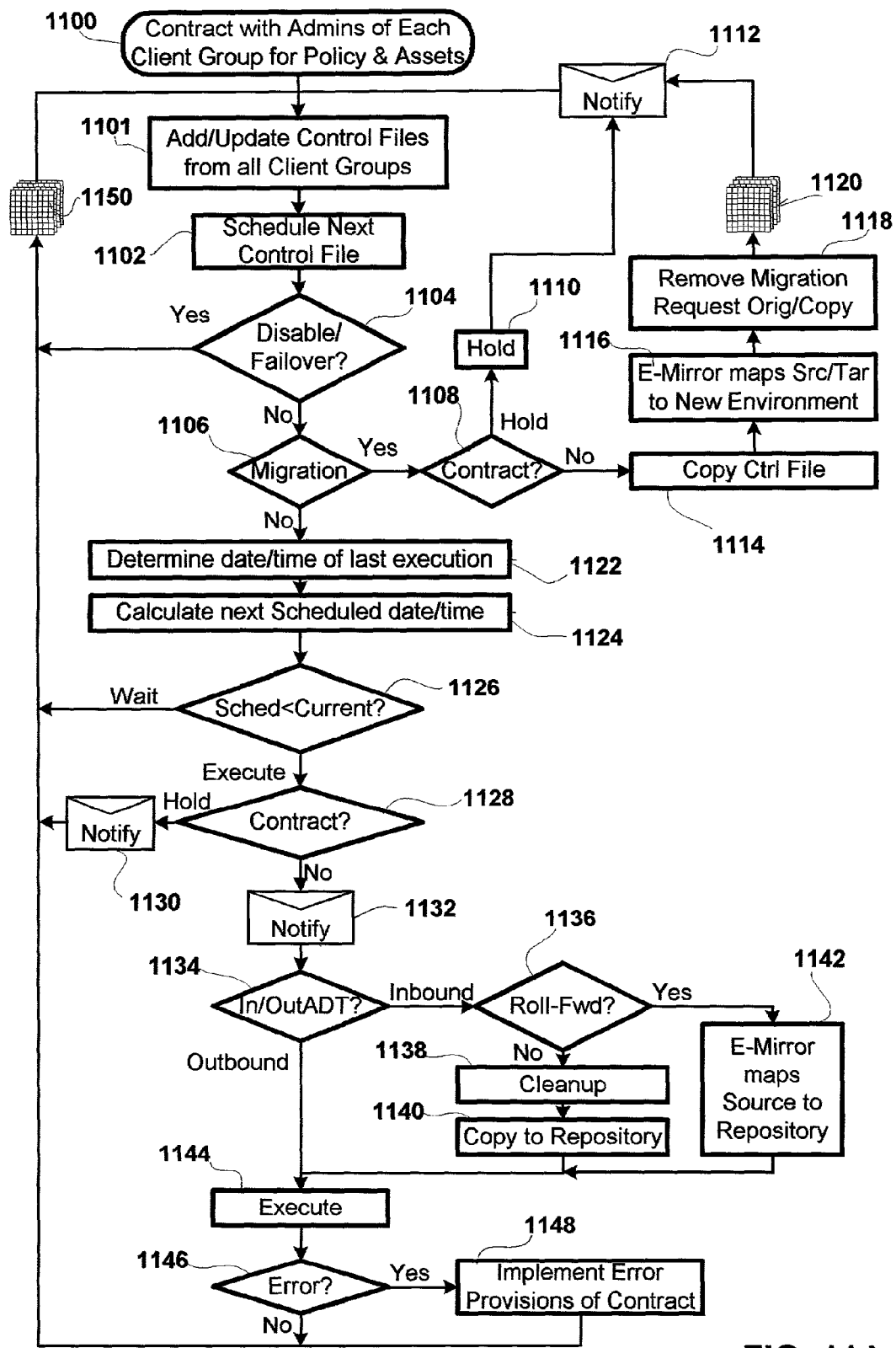
FIG. 11A-B are process flow diagrams of embodiments of the processes executed on the application manager shown in FIG. 1.

FIG. 11A is a process flow diagram of the processes executed on the application manager 104 shown in FIG. 3. In process 1100 contracts are established between the application manager and the administrative member of each client group. The contracts define data policies for managing control files including execution, error, recovery and migration, in each of the environments available to each client group (See FIGS. 4B, 5B, 7A-C). In an embodiment of the invention the contracts also include assets, e.g. hardware and software, selected by the group administrator for each of the environments available to the corresponding client group (See FIG. 4A).

In process 1101 new control files are added to the control files 254 stored in memory 106 (See FIGS. 2-3) and existing control files are updated or deleted. The control files include a data source, a schedule, a data target and parameters for recovery, errors and migration as shown and discussed above in connection with FIGS. 6A, 8A and associated text. Control is then passed to process 1102.

The scheduling of new, updated and existing control files 254 stored in memory 106 (See FIGS. 2-3) begins in process 1102. In process 1102 the next control file, e.g. 1000, 1020, 1040 (See FIG. 10) is fetched from memory 106. In the embodiment shown control files are fetched from memory in round-robin fashion by the scheduler 334 (See FIG. 3). As each control file is fetched it is processed to determine whether it should be executed on each round-robin pass. A number of conditions precedent are imposed on each control files execution including: the terms of the ASP and Client contracts enforced by the contract manager 350 (See FIG. 3) and the recovery status as enforced by the recovery manager 370 (See FIG. 3). In the following acts the processing of one control file, e.g. control file 1000 will be discussed.

In decision process 1104 a determination is made as to whether either the control files intrinsic parameters 1010 or a recovery tag 1016 prohibit the execution of the control file 1000. The intrinsic parameters evaluated in process 1104 are the status of the control file, e.g. 'disabled' or 'hold' (See FIG. 6A references 640-642 and FIG. 8A references 840-842). Additionally, a recovery tag 1014 may have been placed on the control file by the recovery manager 370 (See FIG. 3) with a parameter such as 'hold' which temporarily prohibits during fail-over the execution of the control file until the 'hold' tag is removed, e.g. after an environment on which the control file has a source 1004 or target 1008 (See FIG. 10) has been recovered. If the control file is disabled control passes to process 1150 for entry of the corresponding control file instance and reason for lack of execution, e.g. "disabled" into the control file log 256. Then control returns to process 1101 for adding or updating of control files. If the control file is not prohibited from scheduling on the basis of the above discussed intrinsic parameters then control is passed to process 1106.

In process 1106 a determination is made as to whether the control files intrinsic parameters contain a migration request (See FIG. 6A reference 648 and FIG. 8A reference 848). If there is no migration request control passes to process 1122. If there is a migration request control passes to decision process 1108. In decision process 1108 the contract manager 350 (See FIG. 3) determines whether the terms of the ASP global policy prohibit execution, without approval of the control file in the environment to which the migration request is directed. If they do, then in order for the migration request to be processed further the ASP must have accepted the migration. An ASP manually accepts a control file into a restricted environment by selecting the 'accept' value on the dropdown list icon 842 shown in FIG. 8A. If the migration request is directed to a restricted environment and if the ASP has not accepted the migration request then control is passed to process 1110. In process 1110 the corresponding intrinsic parameter 756 in the migration table shown in FIG. 7B is automatically flipped from its default value of 'null' to 'hold' and will remain in that state during succeeding round-robins until the administrator accepts the request. Control then passes to process 1112 in which the corresponding client is notified of the denial of migration request. Such notification is conditioned on the whether the contract manager determines that notice is required based on ASP contract policy or client contract requirements. Control then returns to process 1101 for the adding and updating of control files. Alternately in decision process 1108, where migration is allowed due to the absence of contractual constraints, control is passed to process 1114. In process 1114 the application manager makes a copy of the control file and updates its environment 1012 (See FIG. 10) to correspond with the requested environment for the migration (See FIG. 6A reference 648 and FIG. 8A reference 848). Then in process 1116 the environmental mapper 344 (See FIG. 3) re-maps in the control file copy the path of whichever of the data source 1004 or data target 1008 lies on the environment to which the control file copy is migrated. Next in process 1118 the migration request parameters in the original control file are removed. This results on the next round-robin in both the original and copied control files being eligible for execution in their respective environments. In process 1120 the log 256 (See FIG. 2) is updated. Then in process 1112 any required client notification of the migration request allowance called for by the contract manager is implemented, subsequent to which control returns to process 1101 for the processing of new or updated control files.

Control files which are not disabled or subject to a migration request pass to process 1122 for further processing. In process 1122 the data and time of last execution of the control file is determined from the time stamp tag 1014 on the control file (See FIG. 10). Then in process 1124 the scheduler 334 (See FIG. 3) using the schedule parameters 1006 (See FIG. 10) of the control file, and the last execution date/time to determine the next date/time at which to execute the control file. In decision process 1126 the next scheduled time is compared with the current date/time. If the schedule calls for execution at a date/time later in time than the current date/time then further processing is halted and control returns to process 1101 for the processing of new or updated control files. Alternately, if the control file schedule calls for execution on or before the current time then control passes to decision process 1128. In decision process 1128 the contract manager determines whether client data policy calls for 'hold and notification' before execution (See FIG. 4B). If it does the contract manager looks at the control file log 254 to determine if there was an immediately preceding instance of this control file for which there was a hold and release by the corresponding client administrator (See FIG. 6C reference 696). For control files which contractually require 'hold and notification' and for which there has been no release control passes to process 1130 in which notice is sent to the administrator requesting the hold. Control then passes to process 1150 for entry of the corresponding control file instance and reason for lack of execution, e.g. "contract hold" into the control file log 256. Then control returns to process 1101 for the processing of new or updated control files. Conversely, when no hold is required or there has been a release, as discussed above, control passes to decision process 1132 any notifications of pending execution of the control file called for by the contract manager are sent to the relevant administrator(s).

In the following decision process 1134 it is determined whether the control file calls for an inbound or outbound ADT. Control files calling for an outbound ADT are passed directly to the execution process 1144 for execution of the ADT. Where the control file calls for an inbound ADT control passes to decision process 1136. In decision process 1136 it is determined whether the recovery manager 370 (See FIG. 3) has tagged the control file with a recovery tag 1016 indicating the control file is being executed during a roll-forward phase of a recovery operation for which the corresponding environment is a data target. If it is control is passed to process 1142 in which the environmental mapper 344 (See FIG. 3) maps the data source to the corresponding copy of the previously transferred data in the repository 258. During the roll-forward phase of recovery inbound data transfers are made not from the original data source on the network but from the copy of the corresponding data stored in the repository. This maintains the integrity of the recovered environment with its pre-failure counterpart and speeds up recovery as well. Control then passes to process 1144 for execution of the control file. If the inbound control file is not part of a roll-forward phase of an environmental recovery then control is passed from decision process 1136 to process 1138. In process 1138 the inbound data from the data source is temporarily stored in the memory 116 of the cleanup server 114 and subject to a virus and other security checks. Then in process 1140 the data is copied to the repository after which the execution of the control file in process 1144 results in the data being injected into the data target of the corresponding environment as specified in the target parameters 1008 of the control file. Additionally, in execution process 1144 the time-stamp tag 1014 is updated to reflect the current execution time. Also, where the recovery tag(s) 1016 include a 'roll-forward' value that is removed since the execution of the control file achieved the roll-forward as to that data source.

In decision process 1146 any execution errors result in control passing to process 1148. In process 1148 the contract manager implements any global ASP error policies with the appropriate notification of error and places on 'hold' the further attempts to execute the instance or other instances of the control file depending on the global ASP policy (See FIG. 7A reference 734 and FIG. 7C). Additionally the control file manager implements the error policies called for by the control file intrinsic parameters 1010. These intrinsic parameters may also call for notification of error and placement on 'hold' of further attempts to execute the instance or other instances of the control file (See FIG. 6A reference 638, FIG. 8A). Whether or not there is an error, a log entry is next created in process 1150 in the control file log 256 with the appropriate execution time and error status if any. Control then returns to process 1101 for the processing of new or updated control files.

Figure 11B:
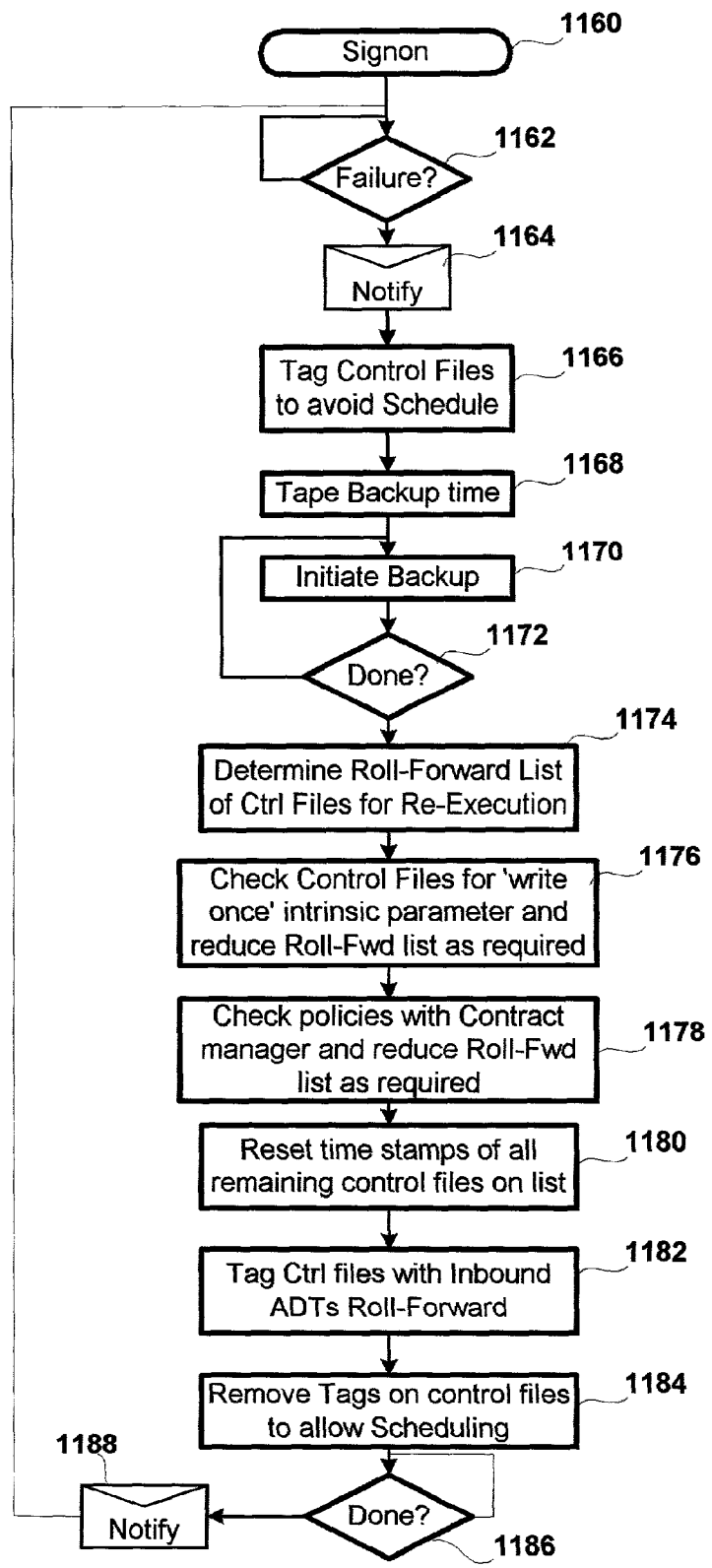

FIG. 11B is a process flow diagram of the processes executed on the recovery manager 370 shown in FIG. 3. After system initialization 1160 control is passed to determination process 1162 in which any failure of a monitored asset is detected (See FIG. 3 reference 372). Any required notifications of failure and the onset of recovery are sent in process 1164. In process 1166 control files with data source or data target on the server which has failed are tagged with a 'hold' recovery tag 1016 (See FIG. 10) to avoid their execution during the recovery of the environment. Then in process 1168 the time of the last full and differential backup of the failed environment is obtained for the tape or other backup unit. Then in process 1170 the recovery manager initiates backup which proceeds through to completion as determined by decision process 1172.

Once the environment(s) on the failed device are recovered on either the same or a failover device control passes to process 1174. In process 1174 the recovery manager determines from the control file log 256 (See FIG. 2) those control file instances with sources or targets on the recovering environment with execution dates/times between the time of the last full and differential backup and the current time. These form a roll-forward list. Then in process 1176 the portion of the roll-forward list containing control files specifying an inbound data transfer is checked by the recovery manager to determine if the recovery parameter is 'write once' or 'overwrite'. Control files specifying an inbound data transfer which include a recovery parameter of 'write once' will be removed from the roll-forward list. Next in process 1178 the recovery manager checks with the contract manager to determine which of the remaining control files on the roll-forward list are by virtue of either client or ASP policy subject to a 'hold' during recovery. These control files are removed from the roll-forward list as well. Then in process 1180 any required administrative/client notifications are sent via e-mail or other communication means.

Next in process 1182 the time stamps 1014 (See FIG. 10) are backdated to coincide with a prior execution instance. This backdating will assure that the scheduler will re-execute the control files. Next in process 1184 those control files on the roll-forward list specifying an inbound data transfer are tagged with a recovery tag 1016 specifying a "roll-forward". This tag when processed in decision block 1136 (See FIG. 11A) will result in subsequent processing of the control file in process 1142 (See FIG. 11A) and re-mapping of the data source to the repository. Next in process 1184 the 'hold' parameter is removed from the recovery tag thereby releasing the control file for scheduling by the scheduler 334 (See FIG. 3). Next in decision process 1186 the recovery manager determines when the scheduling and execution of the roll-forward list has been completed by the scheduler. When the roll-forward is complete notice is sent in process 1188 to the ASP administrator and the affected client administrator's. Control then returns to decision process 1162 for the detection of the next failure.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. An apparatus for managing a plurality of servers hosting at least one hosted application in a plurality of environments accessible to corresponding clients across a network for the exchange of client data; the apparatus comprising a computer coupled to a memory, further comprising:

a control file manager program in a computer memory accessible to an administrative member of each of a plurality of client groups, the control file manager to manage setup, scheduling and execution of control files of a hosted software application for each client group, and with each control file defining an administrative data transfer (ADT) with a data source, a data target, and a schedule for effecting the ADT and with the control file manager including:

a migration module program in a computer memory responsive to a migration request by the administrative member of a corresponding client group to migrate a control file from one of a plurality of environments to another of the plurality of environments for the hosted software application, the plurality of environments comprising a software application development environment, a software application test environment, a software application user acceptance environment, a software application user training environment, and a software application production environment; and an environmental mapper program in a computer memory responsive to the migration request to map the corresponding one of the data source and the data target of the corresponding control file from the one of the plurality of environments to the other of the plurality of environments.

2. The apparatus of claim 1, further comprising:

a contract manager program in a computer memory coupled to the control file manager, and accessible to an administrative member of each group of clients for managing setup of contracts for each client group which specify ADT policies for each client group including policies applicable to the migration requests; and the control file manager scheduling, executing and migrating the control files for a corresponding client group in conformance with the ADT policies.

3. The apparatus of claim 1, further comprising:

each of the plurality of servers having a backup device; and a recovery manager coupled to the control file manager, the recovery manager managing a recovery of a failed one of the servers with a backup restoration from its respective backup device and a re-execution of selected ones of the ADTs with either a data source or a data target on the failed one of the servers during a roll-forward phase of recovery.

4. The apparatus of claim 1, further comprising:

each of the plurality of servers having a backup device;

a repository storing copies of data transferred for inbound ADTs from a data source on the network to a data target located on a selected one of the servers; and a recovery manager coupled to the control file manager and to the repository, the recovery manager managing a recovery of a failed one of the servers with a backup restoration from its respective backup device and a re-execution of selected inbound ones of the ADTs utilizing as a data source the corresponding data source copies stored on the repository.

5. The apparatus of claim 1, further comprising:

a cleanup server for cleanup including a virus scan on inbound ADTs from a data source on the network to a data target on a selected one of the servers;

a repository, coupled to the cleanup server, storing copies of data transferred for inbound ADT from a data source on the network to a data target located on a selected one of the servers; and a recovery manager coupled to the repository and the recovery manager managing a recovery of a failed one of the servers with a backup restoration from the backup device and a re-execution of selected inbound ones of the ADTs utilizing as a data source corresponding data source copies stored on the repository.

6. The apparatus of claim 1 further comprising:

the control file further defining an electronic data transfer of business information between selected ones of the clients on the network and selected ones of the servers.

7. A method for managing a plurality of servers hosting at least one application in a plurality of environments accessible to corresponding clients across a network for the exchange of client data, the method comprising:

a server generating control files each associated with a corresponding client group from parameters submitted by an administrative member of each client group and with each control file specifying for the corresponding client group an administrative data transfer (ADT) with at least a data source, a data target and a schedule and with selected ones of the control files having a migration request from a one to another of the plurality of environments, the plurality of environments comprising a software application development environment, a software application test environment, a software application user acceptance environment, a software application user training environment, and a software application production environment;

a server mapping the corresponding one of the data source and the data target of the selected ones of the control files having a migration request from the one to the other of the plurality of environments; and a server scheduling the control files including the selected ones of the control files for all client groups in each of the plurality of environments to conform with the schedule specified in each control file.

8. The method for managing the servers of claim 7, further comprising:

a server contracting with the administrative member of each group of clients, with each contract specifying data policies applicable to the ADT for each corresponding client group including policies applicable to migration requests; and wherein scheduling further comprises scheduling the control files for all client groups including the selected ones of the control files having migration requests to conform both with the schedule specified in each control file and with the data policies specified in the contract established in the contracting act for the corresponding client group.

9. The method of claim 7, wherein the control files for a corresponding client group specify at least one of:

an application maintenance ADT for upgrading or patching the application on a selected one of the servers hosting the application for the client group; and an electronic data transfer (EDT) ADT between selected ones of the clients on the network and the selected one of the servers hosting the application for the client group.

10. The method of claim 7, further comprising:

restoring an environment of a failed one of the servers on a selected one of the servers; and re-executing selected ones of the ADTs with either a data source or data target on the failed one of the servers on the selected one of the servers to effect a roll-forward phase of recovery.

11. The method of claim 7, further comprising:

storing copies of data transferred for inbound ADTs from a data source on the network to a data target located on a selected one of the servers; and recovering a failed one of the servers with a backup restoration and a re-execution of selected inbound ones of the ADT utilizing as a data source the stored copies of data transferred.

12. A computer program product for managing a plurality of servers hosting at least one application in a plurality of environments accessible to corresponding clients across a network for the exchange of client data; and the computer program product comprising a nonvolatile computer memory with computer readable program code having instructions comprising:

first program instructions to generate control files each associated with a corresponding client group from parameters submitted by an administrative member of each client group and with each control file specifying for the corresponding client group an administrative data transfer (ADT) with at least a data source, a data target and a schedule and with selected ones of the control files having a migration request from a one to an other of the plurality of environments;

second program instructions to map the corresponding one of the data source and the data target of the selected ones of the control files having a migration request from the one to the other of the plurality of environments; and third program instructions to schedule the control files including the selected ones of the control files for all client groups in each of the plurality of environments to conform with the schedule specified in each control file, wherein said program instructions are stored on said nonvolatile computer memory.

13. The computer program product of claim 12, further comprising:

fourth program instructions to contract with the administrative member of each group of clients, with each contract specifying data policies applicable to the ADT for each corresponding client group including policies applicable to migration requests; and wherein the program instructions to perform the scheduling operation further comprise fifth program instructions to schedule the control files for all client groups including the selected ones of the control files having migration requests to conform both with the schedule specified in each control file and with the data policies specified in the contract established in the contracting act for the corresponding client group wherein the program instructions are stored on said nonvolatile computer memory.

14. The computer program product of claim 12, wherein the control files for a corresponding client group further comprise:

sixth program instructions to specify at least one of:

seventh program instructions of an application maintenance ADT for upgrading or patching the at least one application on a selected one of the servers hosting the at least one application for the client group; and eighth program instructions of an electronic data transfer (EDT) ADT between selected ones of the clients on the network and the selected one of the servers hosting the at least one application for the client group;

wherein the program instructions are stored on the computer readable storage medium.

15. The computer program product of claim 12, further comprising:

ninth program instructions to restore an environment of a failed one of the servers on a selected one of the servers; and tenth program instructions to re-execute selected ones of the ADTs with either a data source or data target on the failed one of servers on the selected one of the servers to effect a roll-forward phase of recovery;

wherein the program instructions are stored on the computer readable storage medium.

16. The computer program product of claim 12, further comprising:

eleventh program instructions to store copies of data transferred for inbound ADTs from a data source on the network to a data target located on a selected one of the servers; and twelfth program instructions to recover a failed one of the servers with a backup restoration and a reexecution of selected inbound ones of the ADT utilizing as a data source corresponding data source copies stored in the storing operation;

wherein the program instructions are stored on the computer readable storage medium.

* * * * *